United States Patent [19]

Caruso et al.

[11] 4,293,222

[45] Oct. 6, 1981

[54] CONTROL APPARATUS FOR SPECTROPHOTOMETER

[75] Inventors: Stephen Caruso, Columbia; Kamalakar D. Dighe, Laurel, both of Md.

[73] Assignee: Baxter Travenol Laboratories, Inc., Deerfield, Ill.

[21] Appl. No.: 10,734

[22] Filed: Feb. 9, 1979

Related U.S. Application Data

[63] Continuation-in-part of Ser. No. 881,826, Feb. 27, 1978, abandoned.

[51] Int. Cl.³ .......................... G01J 3/42; G06F 15/20
[52] U.S. Cl. .................................. 356/319; 340/709; 356/323; 356/326; 364/498
[58] Field of Search ............................... 356/319–325, 356/326

[56] References Cited

U.S. PATENT DOCUMENTS

| | | | |
|---|---|---|---|
| 2,621,298 | 12/1952 | Wild et al. | 356/319 |
| 3,297,860 | 1/1967 | Weiss | 356/319 X |
| 3,317,783 | 5/1967 | Neumeister | 340/724 X |
| 3,506,358 | 4/1970 | Baba et al. | 356/319 X |
| 3,510,865 | 5/1970 | Callahan et al. | 340/740 X |
| 3,521,958 | 7/1970 | Treharne | 356/309 |
| 3,561,872 | 2/1971 | Grabowski et al. | 356/319 X |
| 3,637,310 | 1/1972 | Naono | 356/319 X |
| 3,646,331 | 2/1972 | Lord | 364/571 |
| 3,676,005 | 7/1972 | Chance | 356/320 |
| 3,723,008 | 3/1973 | Fukuda et al. | 356/320 |
| 3,734,621 | 5/1973 | Moody et al. | 356/325 |
| 3,901,600 | 8/1975 | Johnson, Jr. et al. | 356/319 |
| 3,967,266 | 6/1976 | Roy | 340/709 |
| 3,972,617 | 8/1976 | Shibata et al. | 356/319 |
| 3,986,776 | 10/1976 | George | 356/319 |
| 4,137,530 | 1/1979 | Hooker, Jr. | 340/723 X |
| 4,171,913 | 10/1979 | Wildy et al. | 356/325 |
| 4,176,957 | 12/1979 | Maeda et al. | 356/319 |

Primary Examiner—Vincent P. McGraw
Attorney, Agent, or Firm—Robert A. Benziger; Thomas R. Vigil; Paul C. Flattery

[57] ABSTRACT

The control apparatus is used with a dual beam spectrophotometer in which light of variable frequency from a light source is split into two beams which are directed along first and second optical paths to a photosensitive device. The control apparatus comprises electric control, processing and memory circuits coupled to the spectrophotometer for receiving and storing signals therefrom such as an output signal indicative of the particular wavelength of the light beams at any point in time and a log difference signal indicative of absorbance. The circuits include a first memory and a second memory for receiving and storing the log difference signals and control and processing circuitry for manipulating the data stored in the memory circuits. A wavelength digital display, an absorbance digital display and a CRT are provided. The control and processing circuitry causes a graph of wavelength v. absorbance to be traced on the CRT corresponding to absorbance data stored in the one memory for a particular wavelength span. A control circuit is coupled to the one memory for causing a cursor operation on the trace. The cursor is seen as an intensified dot on the trace and the control circuit includes a switch and stepping circuitry for moving the dot along the trace in increments as the particular wavelength and absorbance values corresponding to the dot are shown on the wavelength and absorbance displays. The cursor operation is also performed by moving a pen of a recorder in increments on a plotted curve.

3 Claims, 15 Drawing Figures

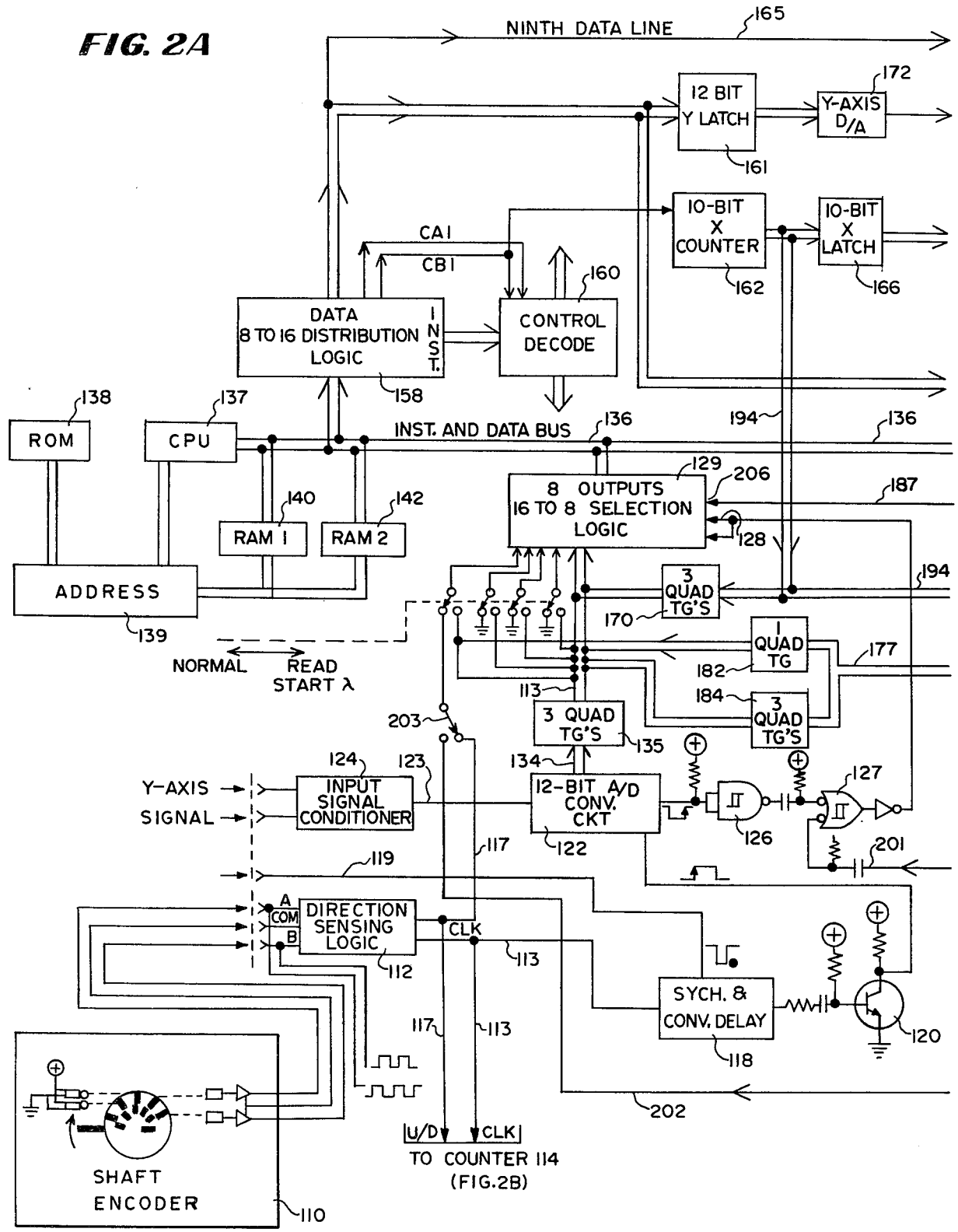

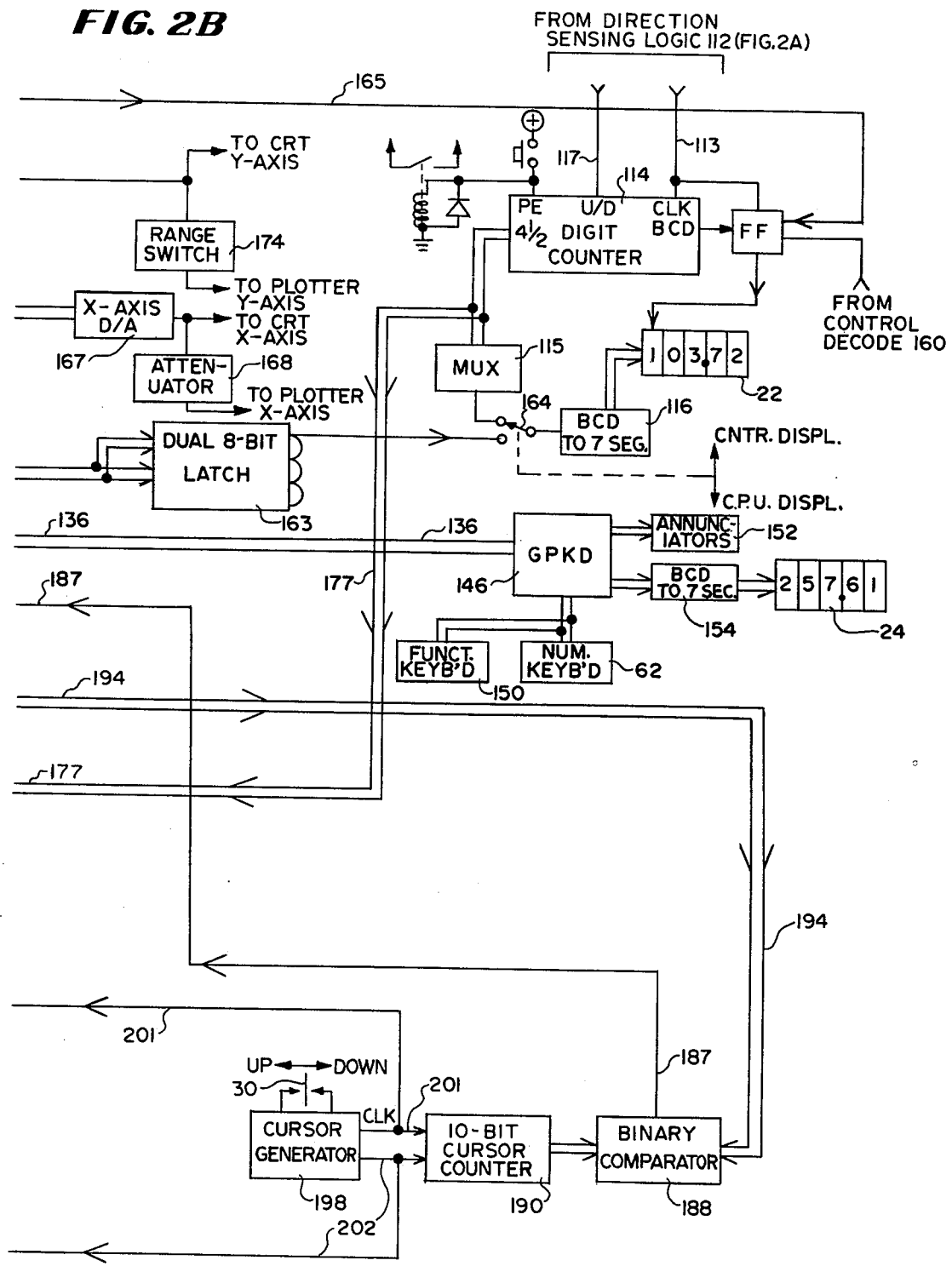

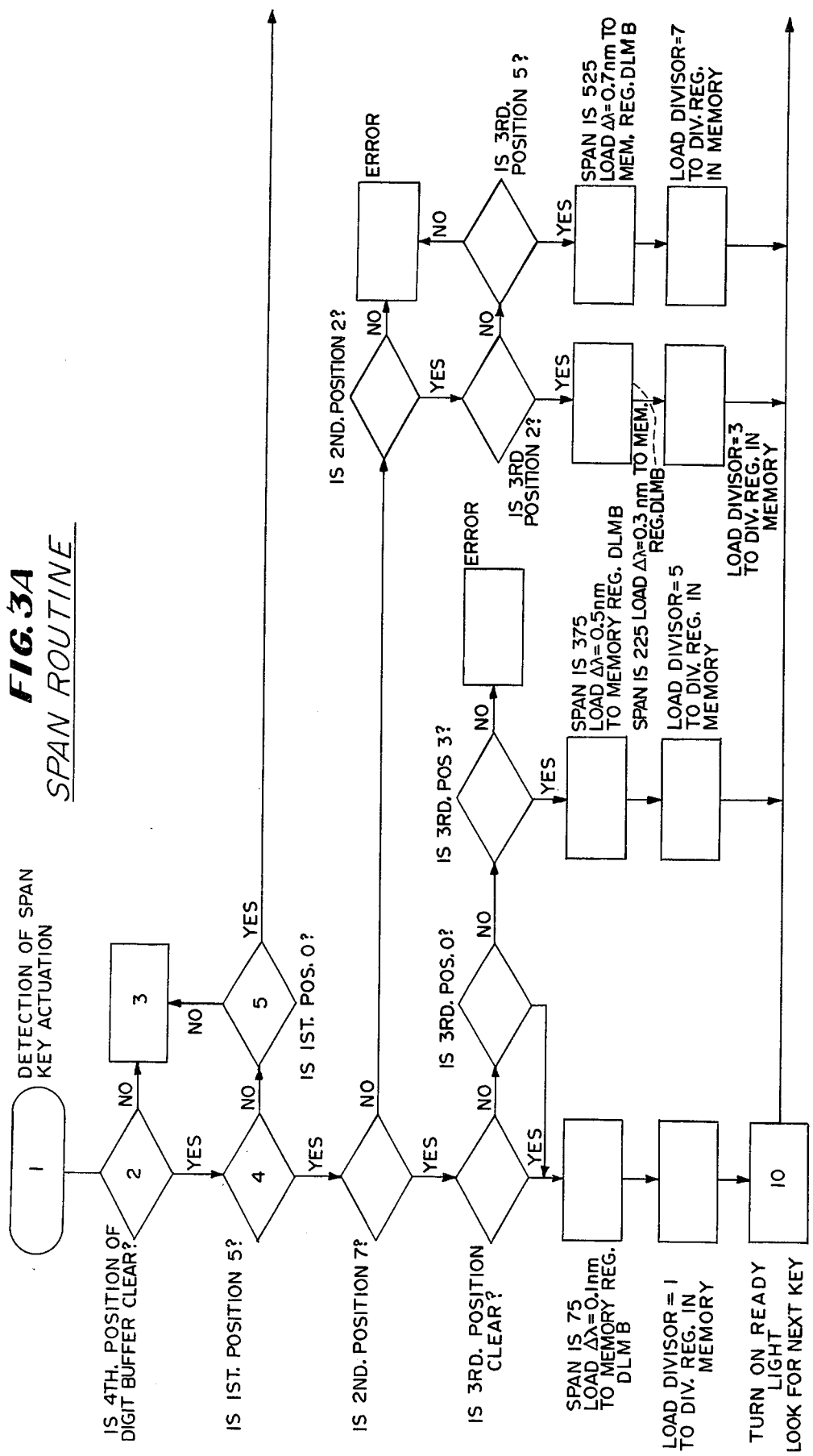

SPAN ROUTINE

DATA INPUT ROUTINE

CRT DISPLAY ROUTINE

DATA ADDITION ROUTINE

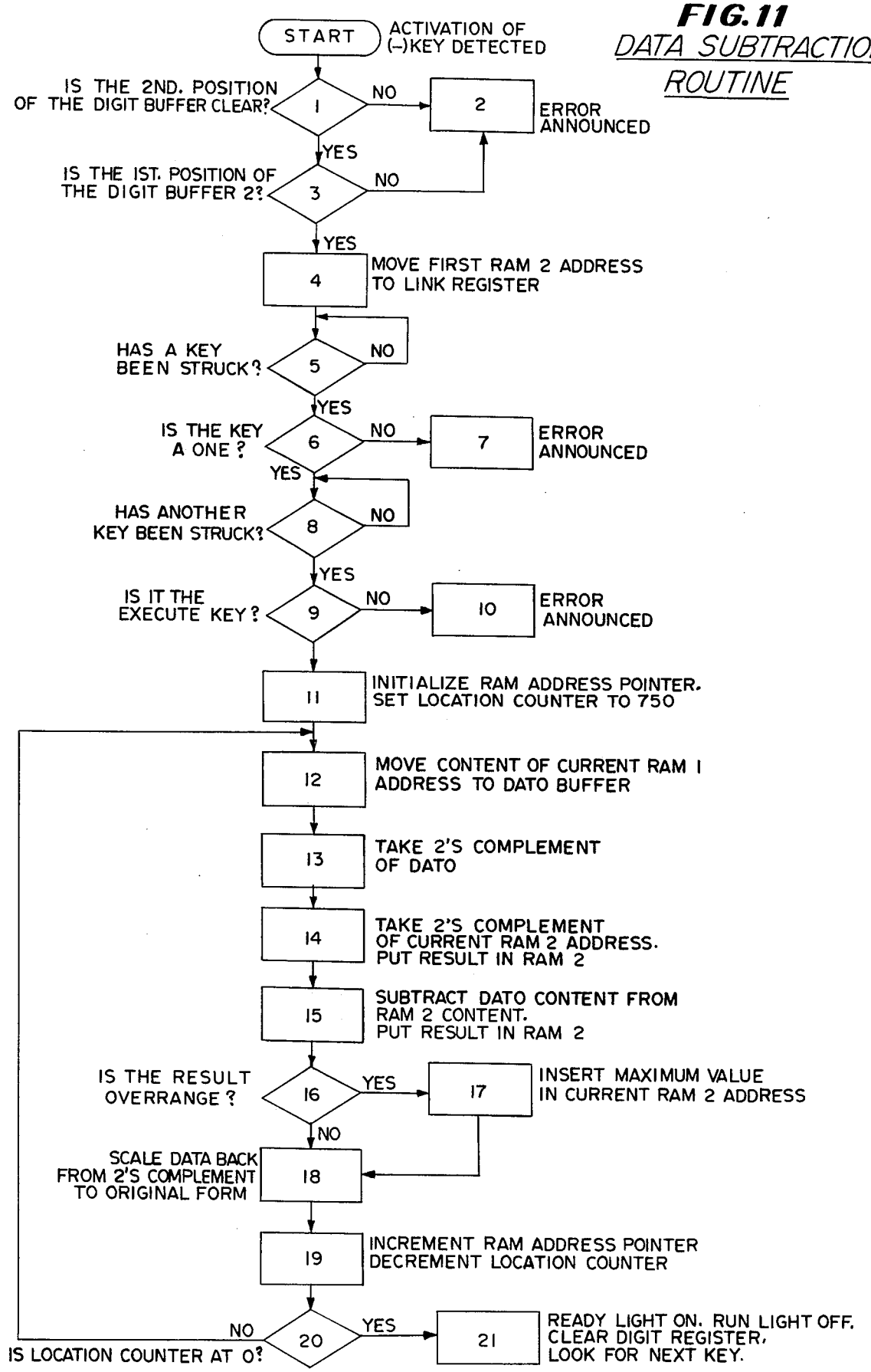
FIG. 11 DATA SUBTRACTION ROUTINE

DERIVATIVE ROUTINE

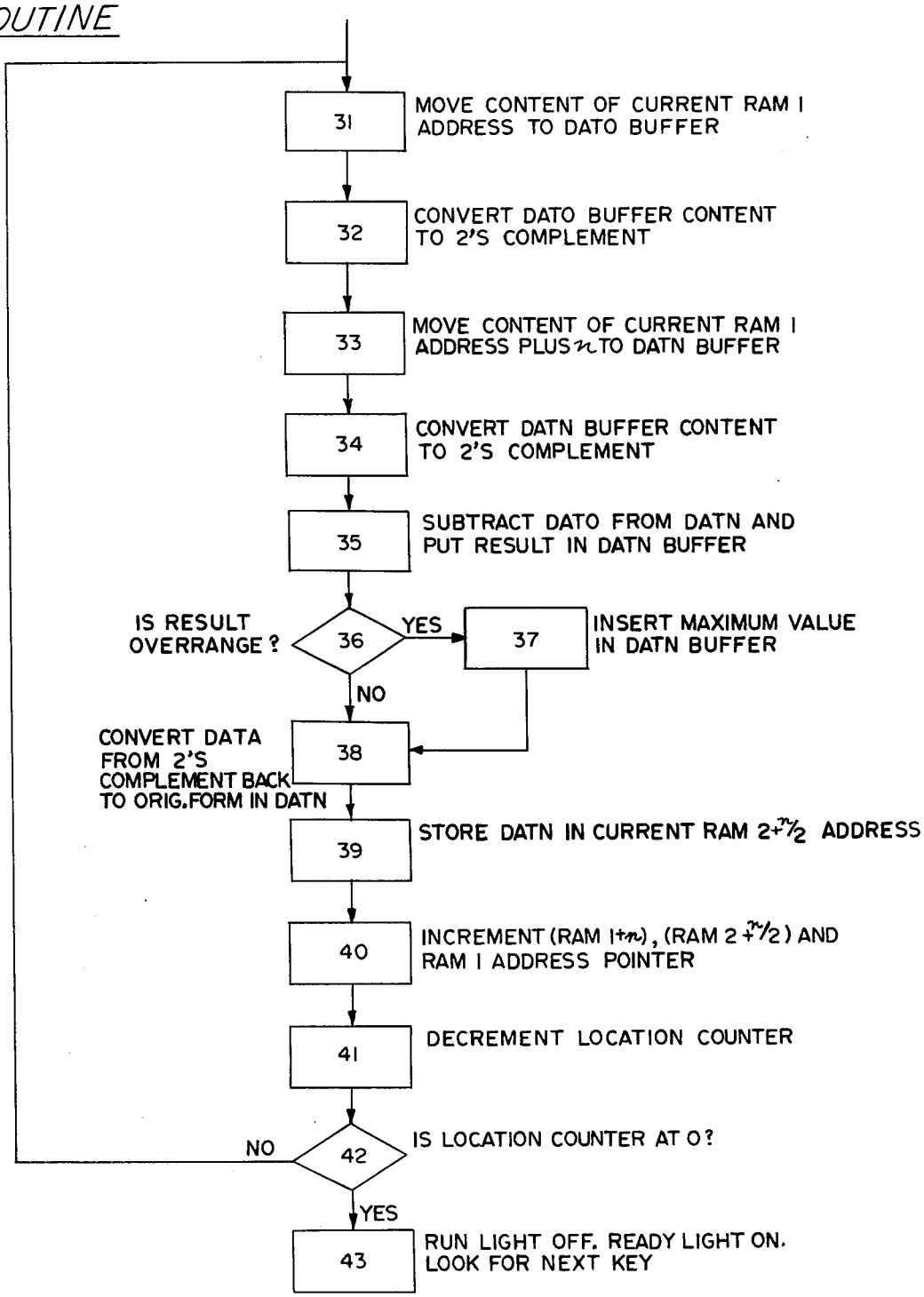

CONTROL APPARATUS FOR SPECTROPHOTOMETER

CROSS REFERENCE TO RELATED APPLICATION

This application is a continuation-in-part of application Ser. No. 881,826 filed Feb. 27, 1978 and entitled DATA MODIFYING APPARATUS, and now abandoned.

BACKGROUND OF THE INVENTION

1. Field of the Invention

The field of the invention is a data modifying apparatus for use with a dual wavelength spectrophotometer.

2. Background of the Invention

Heretofore dual wavelength spectrophotometers have been utilized to pass two monochromatic light beams through a sample cuvette and a reference cuvette respectively, while changing the wavelength over a given wavelength span and recording a difference spectrum, i.e., the difference in absorbance by the sample and reference at the different wavelengths. An example of such a spectrophotometer is the spectrophotometer sold by Baxter Travenol Laboratories, Inc., of Deerfield, Ill., under the trademark DW-2.

In the spectrophotometer, light from a light source is split and directed along two optical paths while the wavelength of the light is changing. In the first path is located a reference station with a reference cell and in the second path is located a sample station with a sample cell. The light that passes through the sample cell is received by a photosensitive device as is the light which passes through the reference cell. The log of the signals generated by the light passing through the sample cell is subtracted from the log of the signals generated by the light passing through the reference cell and the log difference signal is plotted on a recorder.

When the sample cell and reference cell are removed from the spectrophotometer and only air is at the respective sample station and reference station, the difference between the signals generated by light that traverses both of the optical paths should be zero. However, due to different losses of light at different wavelengths in each of the optical paths, the difference between the two sets of signals at different wavelengths varies. When the log of this difference is plotted it forms a wavy baseline rather than a straight baseline. To correct for these differences in light losses in the respective optical paths at different wavelengths it has been proposed to utilize a plurality of potentiometers which are adjusted to render the wavy baseline as close as possible to a zero baseline so that as correct data as possible is obtained when light is passed through a sample and a reference and a difference spectrum is recorded.

The adjustment of such potentiometers can be time consuming and is never completely accurate, since a limited number of potentiometers cannot accurately compensate for every point of interest.

Also various methods and apparatus have been proposed, using tape recorders and associated electronic circuitry or mathematical function performing electrical circuitry for providing baseline or other corrections and for taking and displaying the derivative of a spectrum. Examples of such method and apparatus are disclosed in the following U.S. Patents.

| U.S. PAT. NO. | PATENTEE |
| --- | --- |
| 3,561,872 | Grabowski et al. |
| 3,646,331 | Lord |
| 3,676,005 | Chance |
| 3,972,617 | Shibata et al. |

As will be described in greater detail hereinafter, the data modifying apparatus of the present invention provides electrical control, memory and processing circuitry: for receiving and storing baseline correction signals, for receiving and storing a difference spectrum; for subtracting the baseline correction signals from the difference spectrum; for causing a plot to be made of the corrected difference spectrum on a recorder or oscilloscope; for causing a cursor trace along the plot; for taking the derivative of the corrected difference spectrum; for subtracting one spectrum from another spectrum; and for adding two different spectra.

SUMMARY OF THE INVENTION

According to the invention there is provided a control apparatus for use with a dual beam spectrophotometer of the type in which light from a light source is split into two beams which are directed along respective first and second optical paths to a photosensitive device, the first optical path passing through a reference station and the second optical path passing through a sample station, and of the type which includes means for changing the wavelength of the light from a light source over a predetermined time period through a span of at least 75 nanometers and up to 600 nanometers or some segment thereof, starting at a wavelength of 200 nanometers or greater and proceeding up to a wavelength of 825 nanometers or less, means associated with the wavelength changing means for producing an output signal indicative of a particular wavelength of the light beams at any point in time and signal generating means coupled to the photosensitive device for subtracting the log of each signal generated by the light received by the photosensitive device from the second optical path from the log of each signal generated by light received by the photosensitive device from the first optical path and then producing a log difference signal indicative of abosrbance, said control apparatus comprising electric circuit means including control, processing and memory circuits adapted to be coupled to the spectrophotometer for receiving and storing signals therefrom, said electric circuit means including first memory circuit means and second memory circuit means for receiving and storing the varying log difference signals, control and processing means for manipulating the data comprised of signal values stored in said memory circuit means, said manipulations including transferring data in one memory circuit means to the other memory circuit means, adding data from one to data of the other, subtracting data in one from data in the other and taking the derivative of data stored in one of the memory circuit means, wavelength digital display means, absorbance digital display means, and said control and processing circuit means being coupled to a recorder in the spectrophotometer and being operable to cause movement of a pen of the recorder to plot a spectrum of wavelength v. absorbance on the recorder from a spectrum of varying log difference signals which are related to absorbance and which are stored in said one of said memory circuit means, and said control and processing means including control means coupled to said one of said memory circuit means for causing a cursor operation on the curve plotted on the recorder, said cursor being seen as a holding of the pen at a particular point on the curve and said control and processing means being operable to cause a display on said respective wavelength and absorbance digital display means of the wavelength and absorbance at the particular position of the pen on the curve plotted on the recorder and said control means including means for moving said pen in increments along the curve plotted on the recorder.

Further according to the invention there is provided a control apparatus for use with a dual beam spectrophotometer of the type in which light from a light source is split into two beams which are directed along respective first and second optical paths to a photosensitive device, the first optical path passing through a reference station and the second optical path passing through a sample station, and of the type which includes means for changing the wavelength of the light from a light source over a predetermined time period through a span of at least 75 nanometers and up to 600 nanometers or some segment thereof, starting at a wavelength of 200 nanometers or greater and proceeding up to a wavelength of 825 nanometers or less, means associated with the wavelength changing means for producing an output signal indicative of a particular wavelength of the light beams at any point in time and signal generating means coupled to the photosensitive device for subtracting the log of each signal generated by the light received by the photosensitive device from the second optical path from the log of each signal generated by light received by the photosensitive device from the first optical path and then producing a log difference signal indicative of absorbance, said control apparatus comprising electric circuit means including control, processing and memory circuits adapted to be coupled to the spectrophotometer for receiving and storing signals therefrom, said electric circuit means including first memory circuit means and second memory circuit means for receiving and storing the varying log difference signals, control and processing means for manipulating the data comprised of signal values stored in said memory circuit means, said manipulations including transferring data in one memory circuit means to the other memory circuit means, adding data from one to the data of the other, subtracting data in one from data in the other and taking the derivative of data stored in one of the memory circuit means, wavelength digital display means, absorbance digital display means, and visual display means coupled to one of said memory circuits, said control and processing means being operable to cause a graph of wavelength v. absorbance to be traced and displayed on said visual display means, such graph representing the signal values corresponding to absorbance stored in said one of said memory circuit means for a particular wavelength span and said control and processing means including control means coupled to said one of said memory circuit means for causing a cursor operation on the graph shown on the visual display device, said cursor operation being seen as an intensified dot on the waveform shown on the visual display device and said control means including means for moving said dot along said waveform in increments and for causing the particular wavelength and absorbance values at the point on the graph where the dot is located to be shown on the respective wavelength and absorbance digital display means.

Still further according to the invention the control and processing means of the control apparatus defined above preferably include a central processing unit coupled to said first and second memory circuit means which are random access memory circuits, a read only memory circuit coupled through address circuitry to said central processing unit, selection logic circuitry coupled to said central processing unit and having pulse inputs and an interrupt input, data distribution logic circuitry coupled to said central processing unit and to a Y-axis absorbance control output and to an X-axis wavelength control output, an X counter serially coupled to and between said data distribution logic circuitry and said X-axis wavelength control output, and cursor control means including a manually operated cursor increment upscale-downscale switch, a cursor generator coupled to said cursor increment switch and having outputs coupled to said pulse inputs of said selection logic circuitry, a cursor counter having inputs coupled to said outputs of said cursor signal generator and comparing means coupled to the outputs of said X counter and the outputs of said cursor counter for comparing the counts therein and having an output coupled to said interrupt input of said selection logic circuitry, said cursor control means being operable upon operation of said cursor increment switch to compare counts in said counters and upon coincidence, to send an interrupt signal to said interrupt input of said selection logic to cause updating in buffers in said random access memory circuits of (a) the cursor count of wavelength increments, (b) the wavelength at that particular count of wavelength increments, and (c) the corresponding absorbance value, movement of the electron beam of the oscilloscope being held while such updating takes place causing an intensified spot to develop on the screen of the oscilloscope to create the cursor dot.

BRIEF DESCRIPTION OF THE DRAWINGS

FIGS. 2A and 2B illustrate a block circuit diagram of the electrical control, processing and memory circuitry of the data modifying apparatus of the present invention.

FIGS. 3A-3B illustrate a flow diagram of a Span Routine which includes the operational steps performed by the data modifying apparatus in identifying to the memory circuitry of the apparatus what wavelength span is being spanned by the spectrophotometer.

FIG. 11 illustrates a flow diagram of a Data Subtraction Routine which includes the operational steps performed by the data modifying apparatus in going through a subtraction routine of subtracting the data in one memory from the data in another memory.

FIGS. 12A-12B illustrate a flow diagram of a Derivative Routine which includes the operational steps performed by the data modifying apparatus in taking the derivative of data stored in one of the memories of the apparatus.

DESCRIPTION OF THE PREFERRED EMBODIMENT

Figure 1:
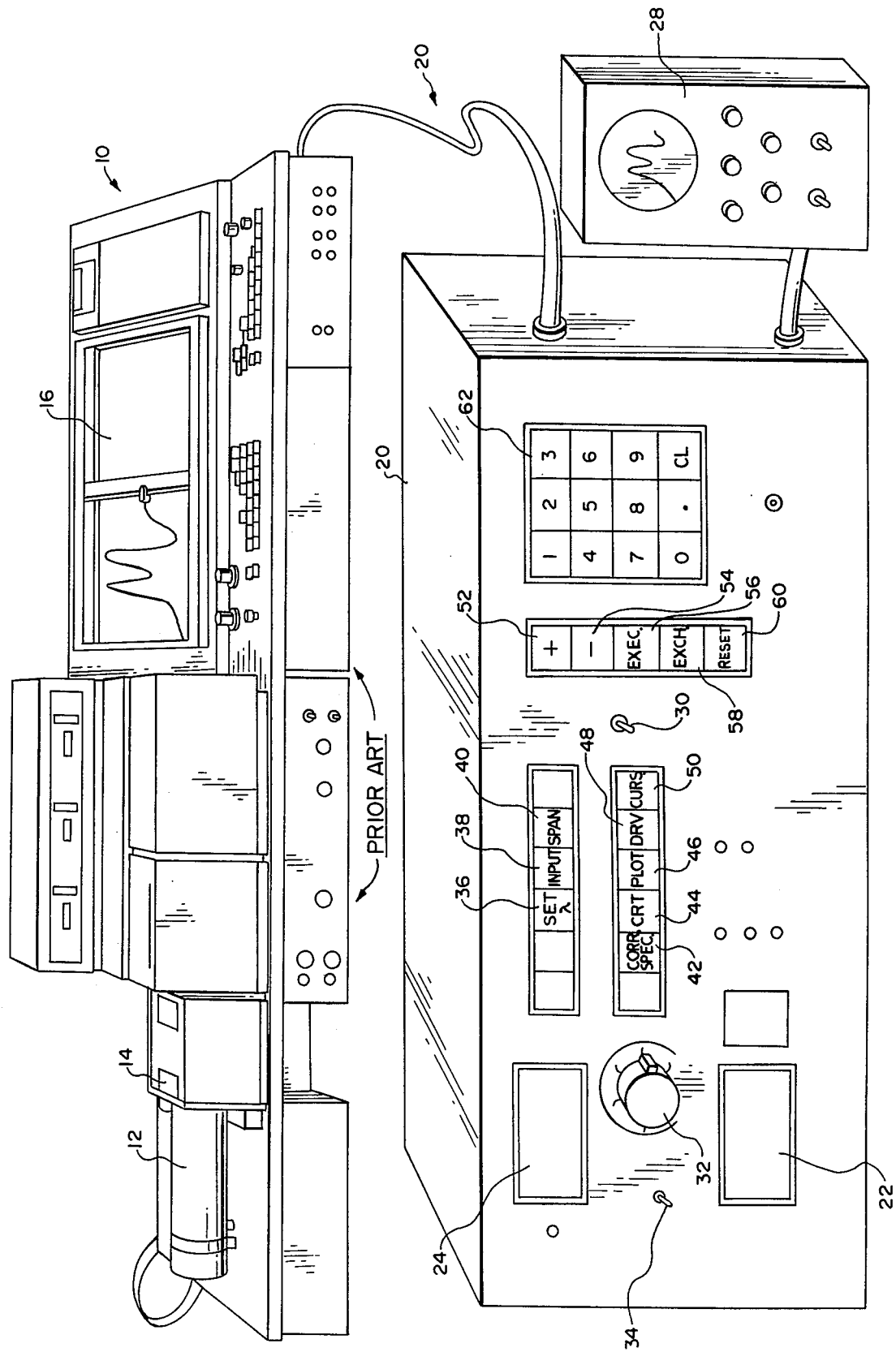
FIG. 1 is a perspective view of the data modifying apparatus of the present invention connected to a dual wavelength spectrophotometer.
Figure 3B:
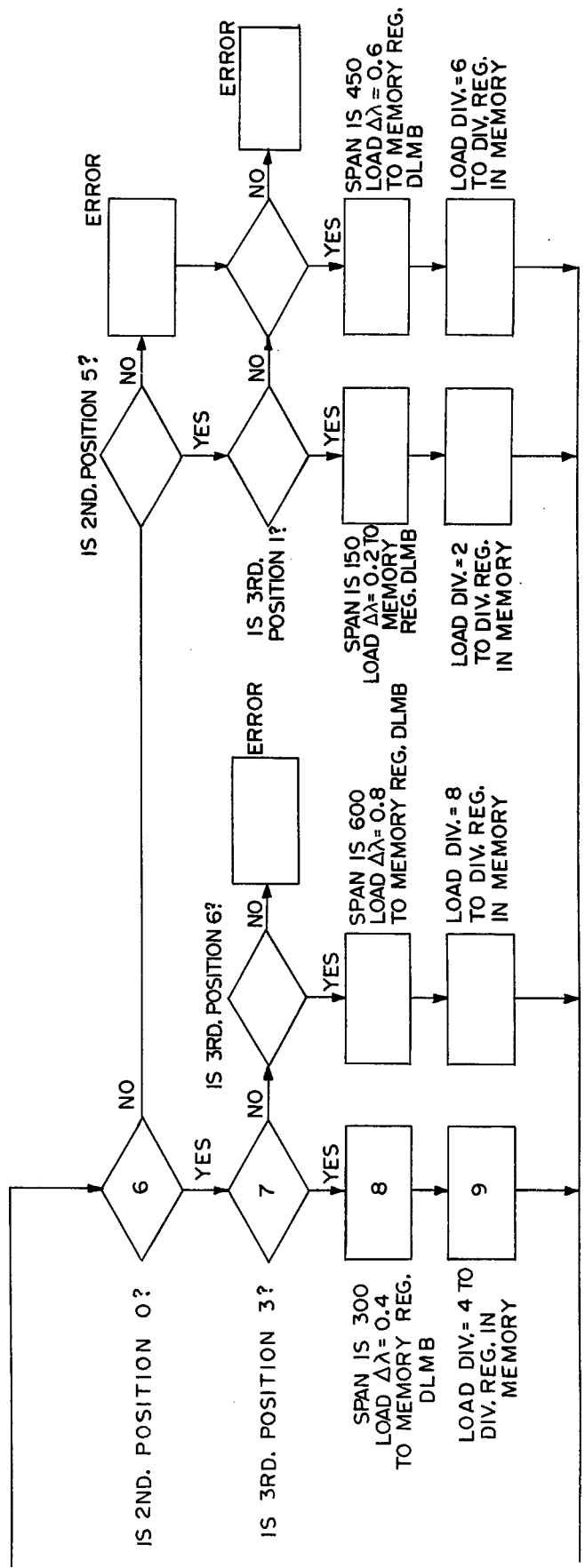
Figure 4:
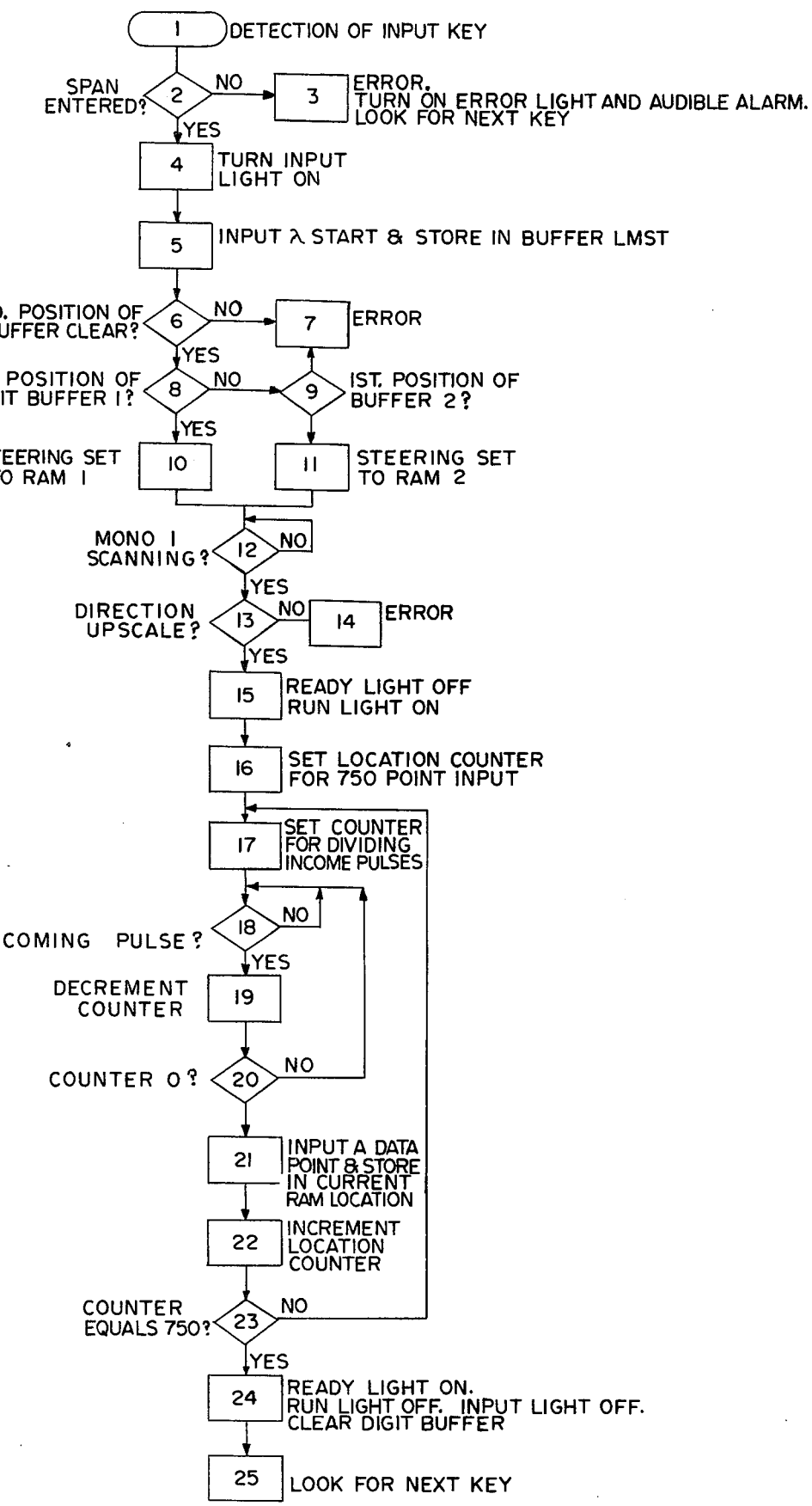
FIG. 4 illustrates a flow diagram of a Data Input Routine which includes the operational steps performed by the data modifying apparatus in inputting data from the spectrophotometer into the memory circuitry of the data modifying apparatus.
Figure 5:
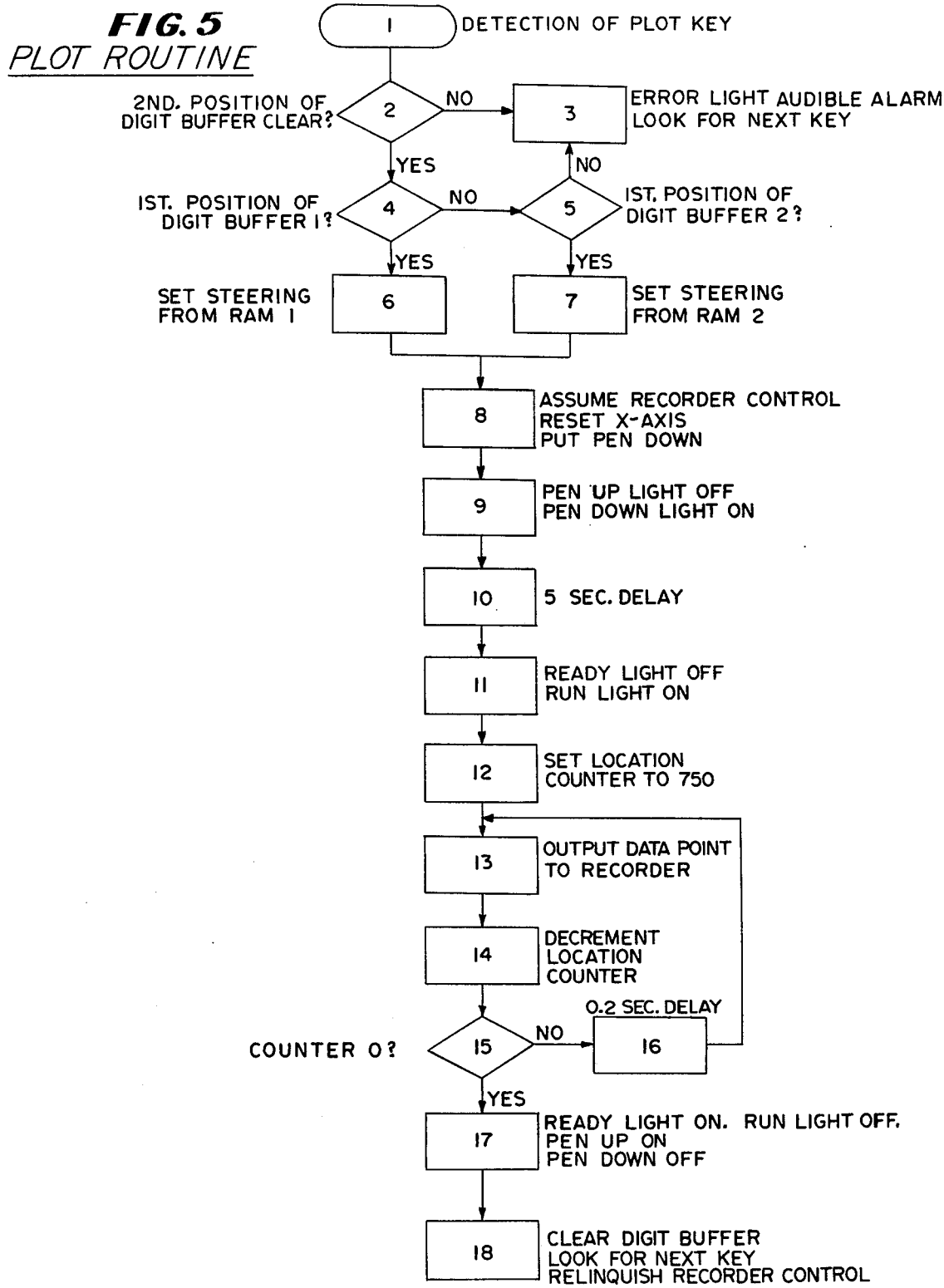
FIG. 5 is a flow diagram of a Plot Routine which includes the operational steps performed by the data modifying apparatus in plotting data stored in the apparatus on the recorder of the spectrophotometer.
Figure 6:
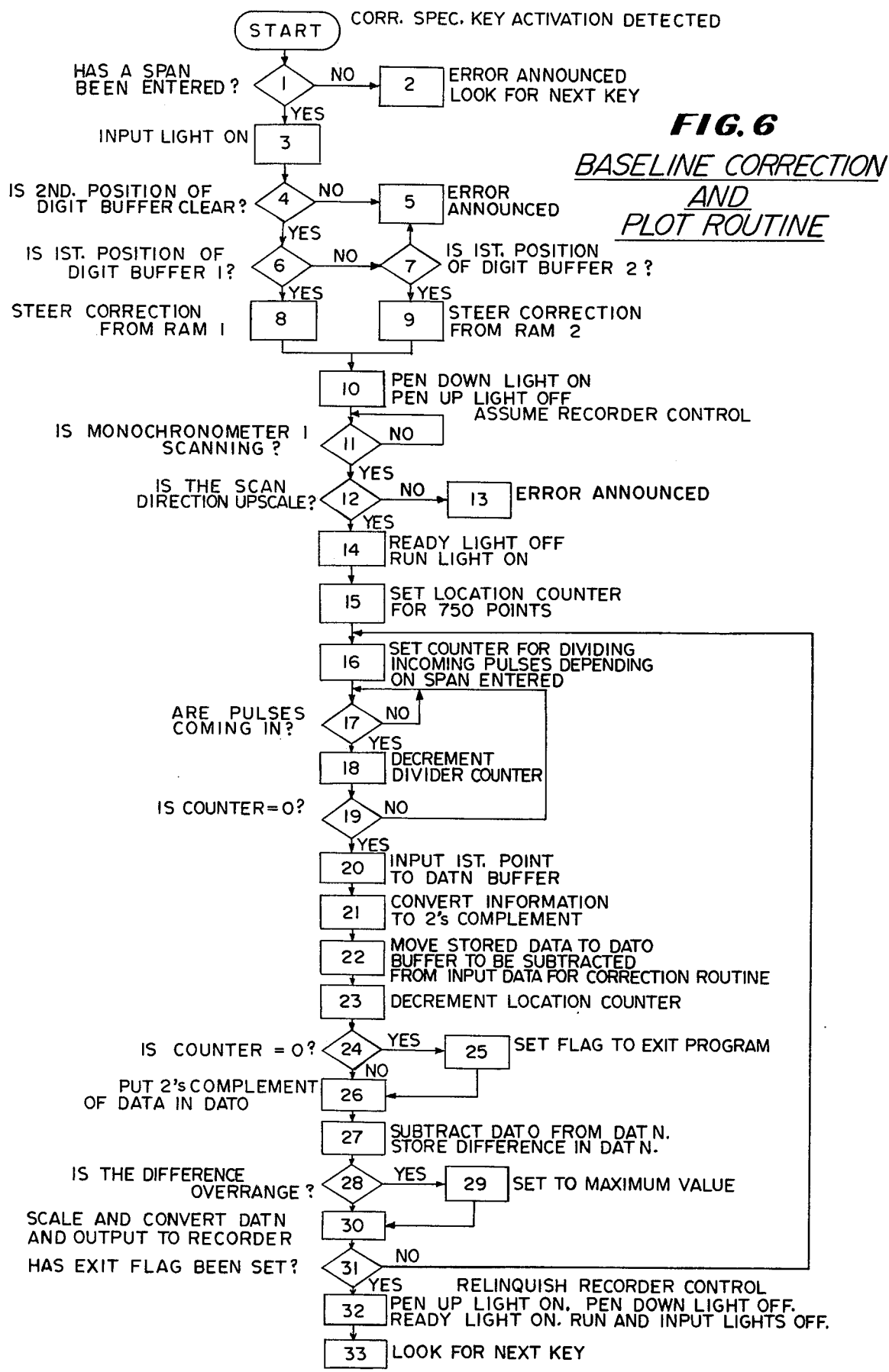
FIG. 6 illustrates a flow diagram of a Baseline Correction and Plot Routine which includes the operational steps performed by the data modifying apparatus in taking baseline correction data from a memory circuit of the apparatus and subtracting it from the output of the spectrophotometer as it is making a scan between two wavelengths and for causing the corrected output from the spectrophotometer to be plotted on the recorder of the spectrophotometer.
Figure 7:
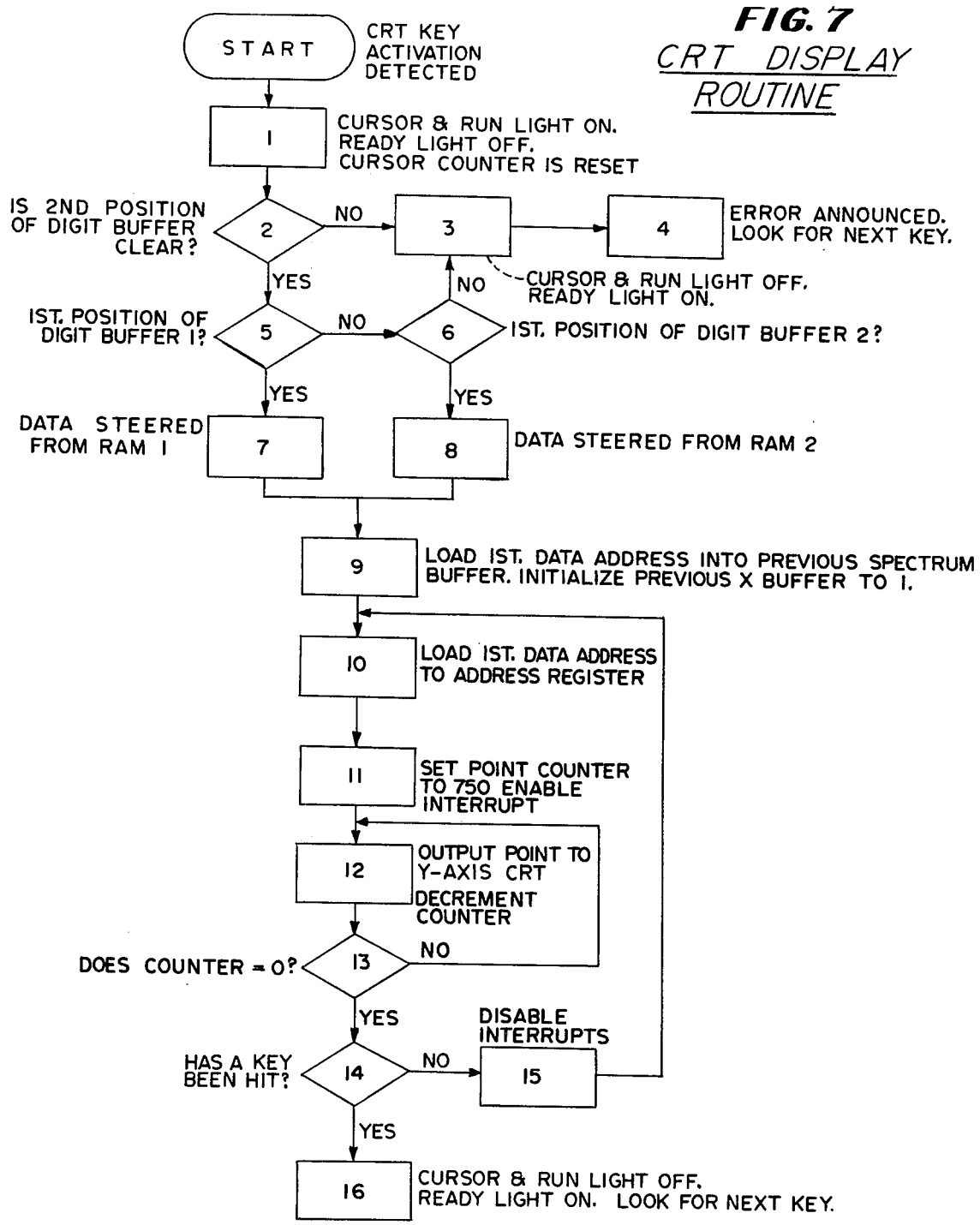
FIG. 7 is a flow diagram of a Cathode Ray Tube (CRT) Display Routine which includes the operational steps performed by the data modifying apparatus in displaying data stored in the memory of the apparatus on the cathode ray tube of an oscilloscope.

Referring now to the drawings in greater detail, there is illustrated in FIG. 1 a dual wavelength spectrophotometer 10 which can be a dual wavelength spectrophotometer sold by Baxter Travenol Laboratories, Inc. of Deerfield, Ill. under the mark DW-2. Such a spectrophotometer 10 includes a light source and optical circuitry (not shown) and a monochromator for generating monochromatic light that is split into two light beams which are directed along respective first and second optical paths. Also the wavelength of the light is varied in increments from a lower value to a higher value over a predetermined period of time. Typically, the wavelength may be varied in increments through a range from 200 nanometers or more up to 825 nanometers or less over a span of 75 nanometers or more up to 600 namometers.

The varying wavelength light beam that traverses the first optical path is passed through a reference station to a photomultiplier tube 12 within a housing. The light beam that traverses the second optical path is passed through a sample station and to the photomultiplier tube 12 within the housing. The reference and sample stations are located beneath a sliding door 14.

It is to be understood that the spectrophotometer 10 has electrical circuitry for taking the logarithm of the signals generated by the photomultiplier 12 in response to light passing through the sample and reference stations, for subtracting the logarithm of the sample signal from the logarithm of the reference signal and for supplying the resultant difference signal to the Y-axis control of a chart recorder or plotter 16. At the same time, electrical signals associated with the mechanism for changing the wavelength of light is applied to the X-axis control of a chart recorder or plotter 16 to move the recorder pen in a horizontal direction relative to the recording paper along a scale related to the wavelength.

Typically, a sample cuvette containing a sample under investigation is positioned at the sample station and a reference cuvette containing a reference solution is positioned at the reference station so that the Y axis of the recorder 16 indicates the light absorbancy of the sample solution as compared with the reference solution, over the range of wavelengths of light indicated by the X-axis.

When there are no cuvettes positioned at the sample station and at the reference station, the two light beams pass through air and theoretically should transmit the same amount of light over the two optical light paths to the photomultiplier tube 12. However, due to differences in the length of each light path, in the refraction and reflection of the mirrors utilized along each light path, and in the characteristics of the photomultiplier tube 12, the light losses over each light path differ for different wavelengths of light. Accordingly, the difference signal produced by subtracting the logarithm of the signal produced by the light traversing the one light path from the logarithm of the signal produced by the light traversing the other light path is an unsteady signal that fluctuates with changes in wavelength even though no sample and reference are present. Thus, when the split light beams are passed through a sample solution and a reference solution to obtain a log difference signal and such log difference signal is utilized to plot the difference in absorbance on the Y-axis of the recorder 16, there is a varying error in the baseline of the plot. To compensate for this baseline error, potentiometers have been utilized in the spectrophotometer 10 to provide plus or minus offset voltages at different wavelengths, and these provide some baseline correction.

According to the teachings of the present invention, baseline correction and other heretofore not readily available functions are obtained by connecting a data modifying apparatus 20 to the spectrophotometer 10. As will be described in greater detail hereinafter, the data modifying apparatus 20 includes control, memory, and processing electrical circuitry for taking the log difference signal produced when the split light beams are passed through air to the photomultiplier tube 12 and for storing this difference signal over a wavelength span as data values stored within a memory of the apparatus 20. These data values can be referred to as baseline correction data values. Next, the apparatus 20 is caused to subtract the baseline correction from the difference signal data captured as and when light is passed through a sample solution and through a reference solution thereby to obtain and plot a corrected log difference signal which is related to absorbance and which is utilized to control the Y-axis movement of the recorder 16.

As will be described in greater detail hereinafter, the apparatus 20 includes two memories and means for exchanging data between the memories and for performing mathematical operations upon the data. In this respect, the baseline correction data is stored within a first memory. Instead of supplying the baseline correction data to the spectrophotometer 10 as a wavelength span of light is passed through the sample solution and reference solution is stated above, the spectrophotometer 10 can be operated to make an uncorrected scan providing an uncorrected set of log difference signal data that is fed into the apparatus 20 and is stored within a second memory. Then the apparatus 20 subtracts the baseline correction data from the uncorrected absorbance data, and the corrected absorbance data may then be sent back to the spectrophotometer 10 and plotted on the recorder 16.

Additionally, the apparatus 20 contains electrical circuitry for not only subtracting the data in one memory from the data in the other memory, but also for adding the data in one memory to the data in the other memory. Still further, the apparatus 20 includes electrical circuitry for taking the derivative of the data in one of the memories. This is useful in finding the peaks and valleys of the curve of absorbance. Additionally, the apparatus 20 has a first digital display 22 for displaying the wavelength at any particular point in a wavelength span. During a cursor routine, it displays the wavelength at which the recorder 16 is tracing at that moment in time. Also provided on the apparatus 20 is a second digital display 24 for displaying the absorbance difference at that wavelength.

The apparatus 20 also has coupled thereto a cathode ray tube oscilloscope 28 upon the face of which the graph of absorbance difference versus wavelength may be displayed, if desired.

The apparatus 20 also contains control circuitry which can affect a cursor operation with either the oscilloscope 28 or the recorder 16. In this respect, the recorder 16 can be caused to move in increments by depressing a bat-handle switch 30 up or down. This switch 30 causes the recorder to move along the curve in increments. Simultaneously, the wavelength and absorbance difference at each point is displayed on the digital displays 22 and 24, respectively. Alternatively, the apparatus 20 can cause a cursor dot to trace along a curve displayed by the oscilloscope 28 in increments. The position of the dot in terms of wavelength and absorbance difference is then displayed upon the digital displays 22 and 24 respectively.

For causing the various operations described above, the apparatus 20 has various controls which will now be described. In this respect, an absorbance range selection switch 32 is provided with two ranges controlled by a switch 34. Also, a key or button switch 36 synchronizes the display 22 of wavelength to that of the monochrometer of the spectrophotometer at the beginning of a scan. Next to that button switch 36 is a key or button switch 38 that initiates the input of data from the spectrophotometer into the apparatus 20. Then there is a key or button switch 40 for inputting the wavelength span of the span being plotted by the recorder 16 into the apparatus 20 using a keyboard identified schematically by reference numeral 62 in FIG. 2B. In this respect, the apparatus 20 is capable of handling any wavelength span between 75 nanometers and 600 nanometers in multiples of 75 nanometers. In other words, it can handle a span of 75 nanometers, 150 nanometers, 225 nanometers, etc., to a span of 600 nanometers.

To set the span of nanometers, one would depress several keys or number buttons 1 to 9 and 0 on the keyboard. Also, a period button and a clear button are provided as shown.

Whatever the span of wavelengths, the apparatus 20 is operable to take in 750 data points, i.e., absorbance data signals throughout the span whatever the length of the span may be.

The apparatus 20 is also provided with control keys or button switches for performing the various operations. For example, a key-button switch 42 is provided for correcting the difference spectrum being plotted. This means that when switch 42 is depressed, the baseline correction data is subtracted from the absorbance difference signal being plotted by the recorder 16. When it is desired to display the data stored in one of the memories on the oscilloscope 28, key number 1 or key number 2 is depressed and then a CRT key 44 is depressed. When it is desired to plot the data in the first memory or the second memory, a plot button switch 46 is depressed, as well as number switch 1 or 2. Likewise, when it is desired to take the derivate, a derivative button switch 48 is depressed. When it is desired to have a cursor operation on the recorder, switch number 1 or 2 is depressed and then a cursor key or button switch 50 is depressed. Of course, once the button switch 50 is depressed, the bat-handle switch 30 has to be operated to increment the cursor on the recorder 16 along the curve being plotted. For a cursor routine on the oscilliscope 28, key number 1 or 2 is depressed following by depressing key-button switch 44. This provides an automatic cursor routine upon operating the bat-handle switch 30.

There is also provided on the front panel of the apparatus 20 function keys or button switches 52, 54, 56, 58 and 60. Key 52 is depressed to cause an addition operation. Key 54 is depressed to cause a subtraction operation. Key 56 is depressed to cause an execution of an operation. Key 58 is depressed to cause an exchange of data from one memory to another memory. And key 60 is depressed to reset the apparatus 20. The buttons or keys for the numbers 1 to 9 and 0 and a period key and a clear key-(button switch) can be referred to as a numeric keyboard and collectively given the reference numeral 62 as shown schematically in FIG. 2B.

Referring now to FIGS. 2A and 2B, there is illustrated therein a block circuit diagram of the circuit components of the apparatus 20.

It will be understood that the spectrophotometer has a wavelength generating device having a shaft position associated with each wavelength before it is split into the two beams and that the particular rotational position of the shaft indicates the wavelength of the light. As the shaft is rotated, the wavelength of the light increases or decreases. A mechanism within the spectrophotometer 10 for determining what wavelength of light is being passed through the sample solution and reference solution senses the rotational position of the shaft. This is accomplished with a shaft encoder that is schematically represented in FIG. 2A and identified by reference numeral 110. The outputs A and B from the shaft encoder 110 are ninety degrees out-of-phase square wave signals that fluctuate in sequence as the shaft is rotated, indicating speed of rotation and, by their phase relationship, direction of rotation. These two signals are coupled to a conventional direction sensing logic circuit 112 of the apparatus 20. The circuit 112 has a clock output 113 which supplies 10 clock pulses per nanometer of light wavelength, or at least one pulse for every tenth of a nanometer change in wavelength, to a counter 114 (FIG. 2B at top). The counter 114 supplies its output through a multiplexer 115 to a BCD-to-seven-segment display converter 116 which drives the digital display 22 to display the wavelength in nanometers at any particular time. The circuit 112 also has a direction output 117 indicating the direction in which the wavelength is changing, either increasing or decreasing, that is fed into the "up/down" input of the counter 114. The most significant count bit is stored in a separate flip-flop "FF" within the counter and is fed directly to the most significant digit of the display 22. In one embodiment, the flip flop "FF" is omitted and a 4 digit counter is utilized.

The apparatus 20 further includes a synchronizer and convert delay circuit 118 comprised of flip flops and having an input 119 for receiving pulses from the spectrophotometer indicating when a signal is being generated. This circuit 118 enables the apparatus 20 to be operated in synchronization with the spectrophotometer 10. An output from the synchronizer circuit 118 is fed through a buffer amplifier circuit 120 and from there into a twelve-bit analog to digital converting circuit 122. This circuit 122 also receives the analog absorbance difference signal (or "Y-axis" signal) from the spectrophotometer via an input line 123 which first passes through a signal conditioner or buffer circuit 124. A "conversion complete" output from the A-to-D converter circuit 122 is fed through Schmitt trigger circuits 126 and 127 to an input 128 of a 16-to-8 parallel data conversion selection logic 129 that is thereby caused to receive digital data from twelve data lines 134 that flow from the A-to-D converter circuit 122 through a transmission gate 135 to twelve inputs of the selection logic 129. From there, the digital information is fed over eight lines to and through an "instruction and data" bus 136 to a central processing unit (CPU) 137. The twelve-bit number is transferred in two steps: Eight bits are transferred as a unit, and then the remaining four bits are transmitted separately over the eight lines of the data bus 136. The CPU 137 has associated with it a read only memory or ROM 138, an address register 139, a first random access memory "RAM 1" 140, and a second random access memory "RAM 2", 142. The 16-to-8 selection logic 129 is manufactured and sold by Rockwell International as Part No. 10453. The CPU 137 is a Rockwell International Microprocessor Chip No. 11806. Although the RAMs 140 and 142 are shown as separate units, they actually comprise a single hardware memory. This memory comprises eight chips having a total memory capacity of roughly four thousand bytes. 1500 bytes are designated RAM 1 and 1500 bytes are designated RAM 2. Accordingly, each random access memory can store 1500 bytes of 8 bits each. Electrically and mechanically, RAM 1 and RAM 2 are integral, functionally they are separate. Other registers in the eight chips are used for a so-called "scratch pad" memory.

The eight-line instruction and data bus 136 also connects to a "GPKD" circuit 146 which is sold by Rockwell International as Part No. 10788. "GPKD" stands for "General Purpose Keyboard and Display". This chip circuit accepts an input from the numeric keyboard 62 and from all of the function keys or button switches of the apparatus 20 shown in FIG. 1. All these function keys are generally identified as function keyboard 150 in FIG. 2B. One output from the circuit 146 connects to annunciators 152 which are light emitting diodes that indicate such things as when a key has been actuated, what mode the apparatus is in, and when an error has occurred. Another output goes to a BCD-to-seven-segment decoder 154 that drives a digital display 24 to display either a numeric keyboard entry or the Y-axis absorbance data.

When one of the button switches or keys of the apparatus 20 is actuated, the circuit 146 signals to the CPU 137 over the data bus 136 which key has been depressed, and the CPU 137 responds by executing an appropriate routine stored within the ROM 138 to carry out whatever action is called for.

Returning to FIG. 2A, an 8-to-16 distribution logic 158 is connected to the instruction data bus 136. The four most significant data outputs from the logic 158 and also two control signals CA1 and CB1 are supplied to a control signal decode logic 160 that functions to decode the four data signals and two control signals into control signals and to distribute the control signals to appropriate places during the various modes of operation of the various circuit elements shown in FIGS. 2A and 2B. These control signals are indicated generally in FIG. 2A. The distribution logic 158 and decode logic 160 thus provide steering information to all of the transmission gates to open and close them at appropriate times and to load and clear all counters and latches at appropriate times. In this respect, although not shown in FIGS. 2A and 2B, it is to be understood that the decode logic 160 provides control signals for all the counters, latches and gates shown in FIGS. 2A and 2B and thereby brings them all under the control of the CPU 137 which in turn is controlled by the programs stored in the ROM 138. The decode logic 160 is a three-to-eight BCD decoder logic unit of conventional design such as the decoder sold by Motorola, Inc. under Part No. Mc14028.

The twelve remaining data lines coming from the 8-to-16 distribution logic 158 flow to a 12-bit Y-axis latch 161. Meanwhile a 10-bit X-axis counter 162 is clocked by a signal from the CB1 output from the logic 158. Eight of the data lines continue on into FIG. 2B to both inputs of a dual 8-bit latch 163 that can supply four digits to the display 22 when a switch 164 is properly positioned. An additional ninth data line 165 flows to the display 22 via the most-significant-bit flip flop "FF" within the counter 114, when a 4½ bit counter is used instead of a 4 bit counter.

The X counter 162 stores a count indicating the wavelength at a particular point in time. The 10-bit output of the counter 162 is stored within a latch 166 and is fed from there to an X-axis digital-to-analog converter 167. It is understood that there are transients when the count within the counter 162 is updated, so the latch 166 preserves a steady signal for the converter 167. As shown, the output from the digital-to-analog converter 167 is supplied directly to the cathode ray tube X-axis deflection circuitry and to the X-axis control of the plotter 16 through an attenuator 168. The output of the counter 162 is also fed through a gate 170 into the 16-to-8 selection logic 129 so that the CPU 137 can have access to the X coordinate count value.

As shown, data from the CPU 137 is also supplied through the logic 158 to the twelve bit Y latch 161. Data stored in the Y latch 161 is supplied to the Y-axis digital-to-analog converter circuit 172, the output of which flows directly to the cathode ray tube Y-axis deflection circuitry and through a range switch 174 to the Y-axis control of the recorder 16.

The output of the latch 163, four bit parallel form, is fed over switch 164 and through the BCD to seven-segment decoder 116 and to the digital display 22. The wavelength data displayed upon the digital display 22 comes directly from a counter 114 which receives this information directly from the spectrophotometer 10 when the switch 164 is in the position shown. Actuation of the switch 164 connects the latch 163 to the converter 116, and one then obtains wavelength information directly from data stored within RAMs 140 or 142. The ROM 138 and CPU 137 control the operation of the switch 164 and the transfer of data into the latch 163.

The output from the counter 114, which indicates the wavelength, is supplied via a line 177 to two transmission gates, 182 and 184 (FIG. 2A). These transmission gates are opened by the decode logic 160 so that the wavelength information in the counter 114 can be drawn through the transmission gates 182 and 184 and into the distribution logic 158 and from thence into the CPU 137. Then the CPU 137 can place this information data in the first RAM 140 or the second RAM 142. Data from the counter 114 also flows into the multiplexer 115 that converts the data in a serial BCD data stream for presentation to the BCD-to-seven-segment decoder 116. The most significant count within the counter 114, stored in the flip-flop "FF", flows directly to the most significant digit position of the display 22 when a 4½ bit counter is used instead of a 4 bit counter.

Referring now to the cursor circuit elements in FIG. 2B, an interrupt signal is fed into the selection logic 129 from a line 187 connected to the output of a binary comparator 188. The binary comparator 188 receives at one of its inputs a count value from a 10-bit cursor counter 190. The output of the X counter 162 is connected via a line 194 to the other input of the binary comparator 188.

A cursor generator 198 is operated by the cursor up/down bat-handle switch 30. With each actuation of the bat-handle switch 30, the generator 198 sends a clock pulse over a line 201 into a "count" input of the cursor counter 190 and through an OR-gate Schmitt trigger 127 and into the pulse input of the selection logic 129 via line 128. The cursor generator 198 also has a direction output which is connected via a line 202 to an "up/down" input of the cursor counter 190 and also through a switch 203 to the selection logic 129.

When the apparatus 20 is operating in the cursor mode, the cursor counter 190 is set to zero and the X counter 162 is also set to zero by the CPU 137 acting through the control decode logic 160. Then, information data stored in the RAM 140 or RAM 142 is put out through the various circuit elements to cause a spectrum or wavelength scan to be generated. The resulting scan is supplied to the horizontal and vertical deflection circuits of the cathode ray tube oscilloscope 28. Now the switch 30 is operated to generate a pulse signal which adds or subtracts a count to the contents of the counter 190. When there is a coincidence between the count in the binary counter 190 and the count received from the X counter 162 via lines 194, an output signal is supplied by the comparator 188 over the line 187 to an interrupt input 206. This interrupt signal is passed on to the CPU 137 where it causes the X and Y signals to be held constant for a short period of time—for example, for a few milliseconds. This pause produces a bright spot on the face of the cathode ray tube that appears as a dot on the curve being drawn. This dot is referred to as the cursor dot and, of course, the wavelength and amplitude of the curve at that point, i.e., the absorbance difference and the wavelength, are displayed upon the digital displays 22 and 24 by the CPU, again in response to the interrupt signal.

In FIGS. 3A-12B are set forth flow diagrams of the operational steps performed by the apparatus 20 for several routines or procedures. The particular routines shown in the flow diagrams have already been identified in the brief description of the drawings. In any event, with these routines placed in the ROM 138, the apparatus 20 is capable of performing various operations, manipulations and routines as identified above and described in more detail below.

SPAN ROUTINE

FIGS. 3A-3B

This routine is utilized to identify to the CPU 137 and ROM 138 what wavelength span is to be spanned by the spectrophotometer. In this routine, the validity of the span is checked and certain registers in the scratch pad memory in the chips containing the RAMs are loaded with the pertinent value of $\Delta\lambda$ and the appropriate divider.

STEP 1. The operator prefixes the actuation of the span key on the front panel by depressing number keys on the keyboard 62 for the desired span. For instance, 300 is punched in and then the span button 40 is depressed. This tells the RAM that the wavelength span of the data that is going to be processed is 300 nm. Those numerals 300 then will be displayed on the Y axis keyboard display 24. These numbers are displayed so one can visually know if a number has been mis-struck. When the span key 40 is punched, the span is entered into the appropriate buffer register in the scratch pad memory and it is kept there as long as another span is not punched in.

STEP 2. If 300 has been punched, the first three positions of the digit buffer have been loaded with 3-0-0. After the span button 40 has been depressed, the routine looks at the 4th position, which should be empty.

STEP 3. If it is not empty, then there is an error; someone has punched four numbers into the span and the NO route out of the decision step 2 is taken to the third or error step which exits the routine.

STEP 4. If it is clear, the next step is for the routine to look at the first position in the buffer and ask if it is a 5. In the case of a 300 nm span, it is not because the 1st position reading from right to left, i.e., reading the least significant digit, is 0.

If it was a 5, then the program would check to see if the span is 75, 225, or 375, all of which end in 5.

From this step on, only the routine for a span of 300 will be explained, it being understood that similar procedures will be followed as shown in the flow diagram to enter the span punched in.

STEP 5. Here a check is made. If the 1st position is neither a 5 or a 0, it is not a valid span, and the NO out, which goes to error step 3, is taken to exit the program.

STEP 6. If it checks out 0, the YES out goes to step 6 which asks if the second position is 0, which it is for 300.

STEP 7 YES out of step 6 goes to step 7 to determine if the 3rd position is 3, which it is.

STEP 8. YES out of step 7 goes to step 8 and makes a statement that the span is 300 and to load $\Delta\lambda=0.4$ in the DLMB (Delta Lambda) register in the scratch pad memory, 0.4 is obtained by dividing 300 by 750 data points and each increment, i.e., each data point, will be 0.4 nm apart.

STEP 9. At this step, since the encoder 110 is putting out a pulse every 0.1 nm, 0.4 is divided by 0.1 to obtain divider 4 which is loaded into the divider register in the scratch pad memory.

STEP 10. READY light is turned on and the CPU 137 scans GPKD circuit 146 for the depression of another key.

DATA INPUT ROUTINE

FIG. 4

This routine is started by striking the input key 38 after number key 1 or 2 has been struck to tell the CPU 137 to put the data in RAM 140 or RAM 142.

STEP 1. The CPU 137 detects depression of the input key 38.

STEP 2. The CPU 137 checks to see if a span has been entered because the input routine will not known what to do or when to terminate if it does not know what the span is. If a span has not been entered, an error is indicated at step 3.

STEP 3. An error is indicated, the program exists, and the error light and audible alarm are turned on.

STEP 4. If a span has been entered, then the input light goes on.

STEP 5. The CPU 137 then acquires from the wavelength display the wavelength that the monochromator is set at, i.e., it says input Lambda (λ) start. In this respect, a wavelength is always indicated by the wavelength display and it is then stored in a buffer called LMST which is an abbreviation for Lambda start.

STEP 6. Now the CPU 137 determines which RAM is to be used. This is done by first determining if the second position of the digit buffer is clear. If more than one number has been entered, there is an error and the routine goes to step 7.

STEP 7. An error is indicated.

STEP 8. If the second position digit is clear for the buffer, the CPU 137 asks if there is a 1 in the first digit position.

STEP 9. If the answer is no, the next question, is there a 2 in the first digit position, is asked.

STEP 10. If the answer at step 8 is yes, then the steering of data is to RAM 1.

STEP 11. If the answer at step 9 is yes, then the steering of data is to RAM 2. If it is not a 2, then it is not acceptable and the routine goes to step 7 to indicate an error.

STEP 12. Now, the CPU 137 checks to see if any pulses are coming out of the encoder 110 which means that monochromator-1 is scanning. If the answer is no, monochromator-1 is not scanning and the routine cycles through the loop shown. This will happend until the reset key 60 is depressed. When a pulse is sensed, the routine goes to step 13.

STEP 13. Next the CPU 137 determines if the monochromator is going up or down.

STEP 14. If the answer is no to the upscale direction, an error indication is given.

STEP 15. If the direction is upscale, the ready light is turned off and the run light is turned on.

STEP 16. Next, since there are 750 points of data, the program or routine loads the constant 750 into a location counter in the chosen RAM.

STEP 17. For a span of 300, the divider number is 4, and this number was loaded into the divide register so that every pulse coming out of the encoder 110 is divided by 4. Every fourth pulse will be 0.4 nm apart so the program will input date every 0.4 nm. In other words, the divide counter is loaded by 4 and that allows a pulse every 0.4 nm to be loaded into the RAM. This counter is in the Y register of the CPU 137.

STEP 18. At step 18, the CPU 137 looks for a pulse. If NO the routine loops as shown.

STEP 19. If there is an incoming pulse, that pulse decrements the divide counter, i.e., decreases the count to 3. This continues until there is a decrement to zero in the divide counter.

STEP 20 The CPU 137 checks the divide counter and when it is at zero, the CPU 137 goes to step 21 to input data point.

STEP 21. Now after the CPU 137 decrements the divide counter 4 times, the wavelength has shifted or travelled 0.4 nm and it is time to input a data point. The CPU 137 then inputs a data point and stores it in the current RAM location and that is wherever the RAM address counter happens to be. The RAM address counter was initialized when the CPU 137 checked to see which RAM 1 or 2, was to be used. That was part of the steering operation.

STEP 22. The CPU 137 then commands an increment of the location counter. Now what happens is this: one data point is input and the location counter is incremented to indicate that there are 749 points to go.

STEP 23. Then the CPU asks if the counter has counted 750.

If NO, the routine goes back to step 17 as shown and repeats the data point input steps 17–23 until 750 data points have been inputed. At the end of 750 points, the answer is YES and the routine goes on to step 24.

STEP 24. At this step, the ready light goes on, the run light goes off, the input light goes off, and the digit buffer containing the RAM number 1 or 2 is cleared.

STEP 25. Next the CPU 137 looks to see if another key or button has been depressed.

PLOT ROUTINE

FIG. 5

This routine is employed to output a spectrum on the spectrophotometer recorder or plotter from RAM 1 or RAM 2. The routine begins after the striking of number key 1 or 2 followed by the striking of the plot key 46.

STEP 1. Detection of depression of plot key 46.

STEP 2. The CPU 137 then checks the second position of the digit buffer to see if it is clear.

STEP 3. If it is not clear, an error indication is made.

STEP 4. Next the first position of the digit buffer is checked to see if the number is 1.

STEP 5. If NO at step 5, a check is made to see if the number is 2.

STEP 6. If the number is 1 the steering from the control decode 160 is to RAM 1, i.e., RAM 140.

STEP 7. If the number is 2, the steering is to RAM 2. Since the data is coming out of RAM 2, number 2 is the number sensed.

STEP 8. At this step the data modifying apparatus assumes control of the recorder, the pen is moved down and reset along the X axis to the zero position.

STEP 9. Now the pen up light is turned off and the pen down light is turned on.

STEP 10. A delay of 5 seconds is incorporated into the routine to allow time for a number of electromechanical functions to take place, e.g., operation of relays of the recorder pen, which is backtracking to zero.

STEP 11. Now the ready light is turned off and the run light is turned on.

STEP 12. The data modifying apparatus is outputting 750 points and a location counter is set for 750 data points.

STEP 13. The first data point is outputted.

STEP 14. Next the location counter is decremented to 749 (1 data point out).

STEP 15. Here the question is asked "Is the count equal to zero?". If the answer is no, the routine goes to step 16.

STEP 16. At step 16, a 0.2 second delay is incorporated into the routine to allow time for movement of the pen and then steps 13 and 14 are repeated.

STEP 17. When the answer is yes, i.e., the count is now zero, the plot is completed and the ready light is turned on, the run light is turned off, the pen up light is turned on and the pen down light is turned off.

STEP 18. The routine now relinquishes control of the recorder 16, clears the digit buffer and looks for the actuation of the next key.

CORRECTED SPECTRUM ROUTINE
FIG. 6

This routine is employed to plot a corrected spectrum. This is done by subtracting a spectrum which has been stored in RAM 1 or 2. The particular RAM is indentified by first striking number keys 1 or 2 before striking the Corr. Spec. key 42. The baseline data spectrum that was first obtained from the spectrophotometer 10 by saving the data points of the log of the light transmitted through the reference station minus the log of the light transmitted through the sample station for different wavelengths of light in a selected wavelength span when only air is present at the stations is subtracted in this routine from the spectrum currently being output from the spectrophotometer 10. The resulting corrected spectrum is then plotted on the recorder 16.

STEP 1. After the Corr. Spec. key 42 has been depressed the routine checks to see if a wavelength span has been entered.

STEP 2. If a span was not entered, an audible and visual error indication is initiated.

STEP 3. If a span was entered, the INPUT light is turned on.

STEP 4. A check is then made of the first position of the digit buffer to see if there is a digit punched in.

STEP 5. If there is no digit in the buffer, an error indication is initiated.

STEP 6. If there is a digit in the digit buffer, the routine then checks to see whether the digit is 1; if it is a 1, the routine goes to step 8.

STEP 7. If the digit is not 1, a check is made to see if the digit is 2, and if it is a 2, the routine goes to step 9, if it is not a 2, the routine goes to the step 5 error indication.

STEP 8. Here a decision is made to steer the baseline correction data from RAM 1.

STEP 9. Here the decision is made to steer the baseline correction data from RAM 2.

STEP 10. After the steering information is directed to the appropriate RAM 1 or 2, the pen down light is turned on and the pen up light is turned off.

STEP 11. A check is made to see if the spectrophotometer 10 is scanning with the monochromator. As long as the answer is NO, the routine will continue looping through step 11.

STEP 12. If the answer is YES, the routine then checks to see if the direction is upscale.

STEP 13. If the direction is not upscale, an error indication is made.

STEP 14. If the direction is upscale, the ready light is turned off and the run light is turned on.

STEP 15. Next the location counter is set for 750 data points.

STEP 16. Here the divider counter is set for dividing the incoming pulses by a number dependent upon the span that has been entered. There is a location in the scratch pad memory that contains the particular number that the routine has to divide by and when step 16 is reached, that number from the scratch pad memory is loaded into one of the registers in the CPU 137.

STEP 17. Here a check is made for incoming pulses from the monochronomator-1. The routine will loop around step 17 until an incoming pulse is sensed.

STEP 18. When an incoming pulse is sensed, the divider counter is decremented.

STEP 19. Next a check is made to see if the divider counter has been decremented to 0. if not, there is a loop back to step 17 as shown. For example, if the span is 375 and is starting at 300 nm and going to 675 nm, and there is an output of 10 pulses per nm, a total of 3750 pulses will be received by the data modifying apparatus 20. 3750 divided by 750 equals 5.

Accordingly, the number the routine is dividing by is 5 and the counter will be decremented to 0 every 5th pulse so that at every 5th pulse a data correction and plot is made of the data at that point.

STEP 20. Now when the 5th pulse has been counted, the routine takes a sampling of the signal at that data point and enters it into a buffer called DATN buffer, which is an abbreviation for "data in buffer". This buffer is in the scratch pad memory.

STEP 21. Next that data is converted to 2's complement which is the number base system in which the subtraction is performed by the apparatus 20.

STEP 22. Now the stored data for that data point (the 5th pulse) is moved from the RAM 1 to a DATO buffer, which is an abbreviation for "data out buffer".

STEP 23. Decrement the location counter from 750 to 749 indicating that the first of the 750 points has been corrected.

STEP 24. A check is made to see if the location counter has been decremented to 0.

STEP 25. If YES, then an exit flag is set for exiting from the routine.

STEP 26. From either step 24 or 25, the routine goes to step 26 where the data point value in DATO is converted to 2's complement.

STEP 27. The data point value in DATO is then subtracted from the data point value in DATN and the result is placed in the DATN buffer.

STEP 28. At this step a check is made to see if the data value put in DATN is within the valid range of output value of data. In this respect, because of the binary code, there could be a discontinuity analogous to the discontinuity in an odometer when the mileage indication goes from 99,999 to 0 when actually it has gone to 100,000. To prevent this from happening, a check on the maximum value of the valid range of output value for the data is made.

STEP 29. If the value of the data is greater than the maximum value, the value for that data point is set to the maximum value. If the answer is NO or if the data value has been set to maximum value, the routine goes on from step 28 or 29 to step 30.

STEP 30. Next the data value in 2's complement which is stored in DATN is reconverted back to a data value form which is output to the recorder 16.

STEP 31. A check is made to see if the exit flag has been set at step 25. If NO, the routine cycles back to step 16 to repeat steps 25–31 until 750 data points have been plotted. If YES, the routine goes on to step 32.

STEP 32. At this step control of the recorder is relinquished, the pen up light is turned on, the pen down light is turned off, the ready light is turned on, the run light is turned off and the input light is turned off to indicate that the routine is completed.

STEP 33. The CPU 137 then looks for the actuation of another key.

CRT DISPLAY ROUTINE

FIG. 7

This routine displays the contents of RAM 1 or RAM 2 on the cathode ray tube (CRT) oscilloscope 28. This routine displays each Y axis (absorbance) data point and then sends out a pulse that increments the X counter. In other words, a data point along the Y axis is shown on the CRT and a pulse is generated which increments the X axis counter. This pulse also goes to the X axis sweep in the CRT to increment the X axis at the appropriate wavelength on the X axis. This continues until all the data points stored in the RAM 1 or 2 are displayed and at the end of 750 data points the location counter and X axis sweep retrace on the oscilloscope.

At this point the X counter is reset so that X equals 0 on the scope. During the retrace, the count in the X counter is compared to the count in the cursor counter, the value of which was originally set to 0 and which is changed by operating the bat handle switch 30. When there is coincidence between the count in the X counter and the count in the cursor counter, there is an interrupt routine which is described in connection with the Description of FIG. 8 and the CRT Display Routine then "jumps" to the Interrupt Cursor Routine as will be explained in more detail hereinafter.

Figure 8:
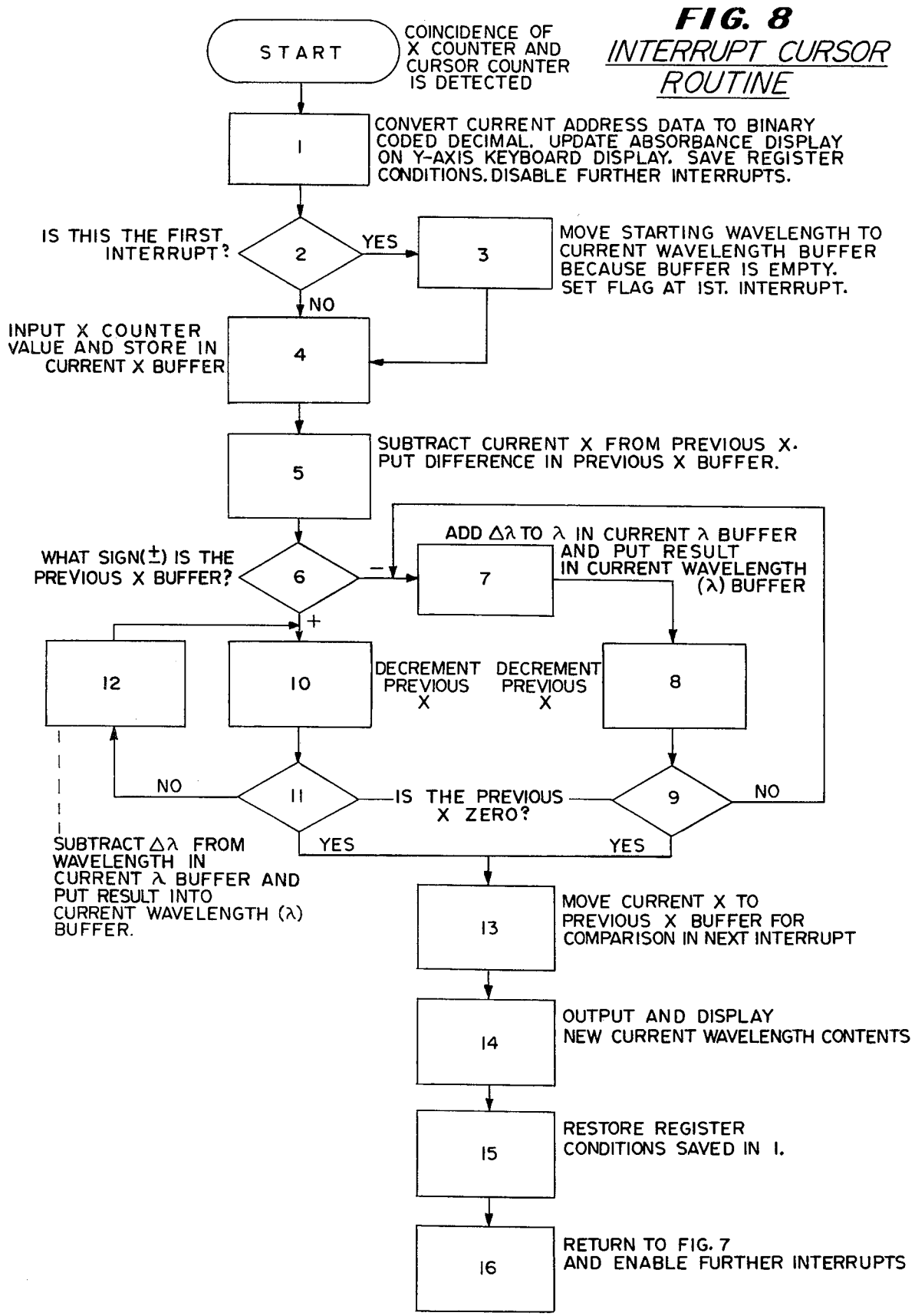
FIG. 8 is a flow diagram of an Interrupt Cursor Routine which includes the operational steps performed by the data modifying apparatus causing operation of the cursor routine on the oscilloscope.
Figure 9:
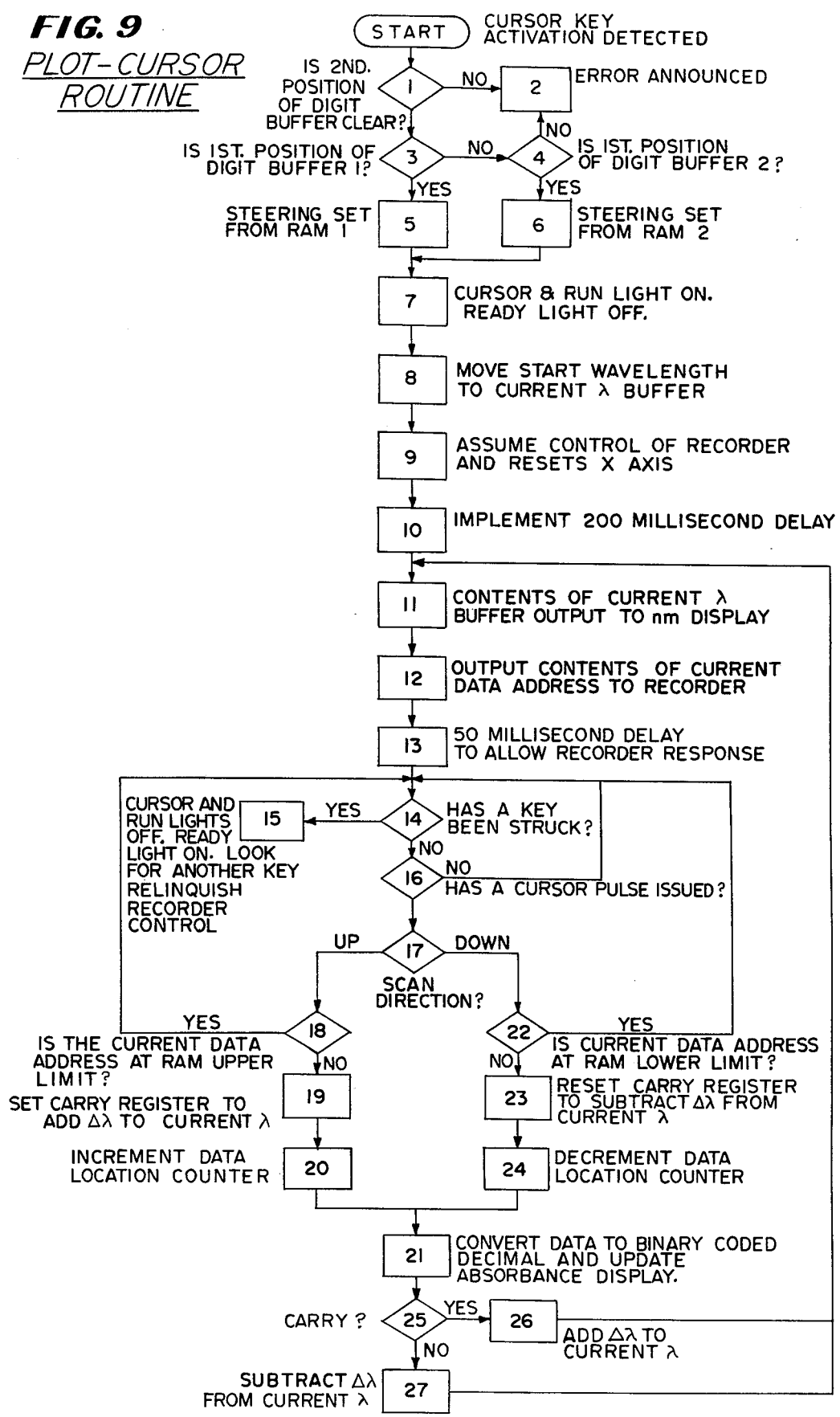
FIG. 9 illustrates a flow diagram of a Plot-Cursor Routine which includes the operational steps performed by the data modifying apparatus in causing a cursor routine to be accomplished on the recorder.
Figure 10:
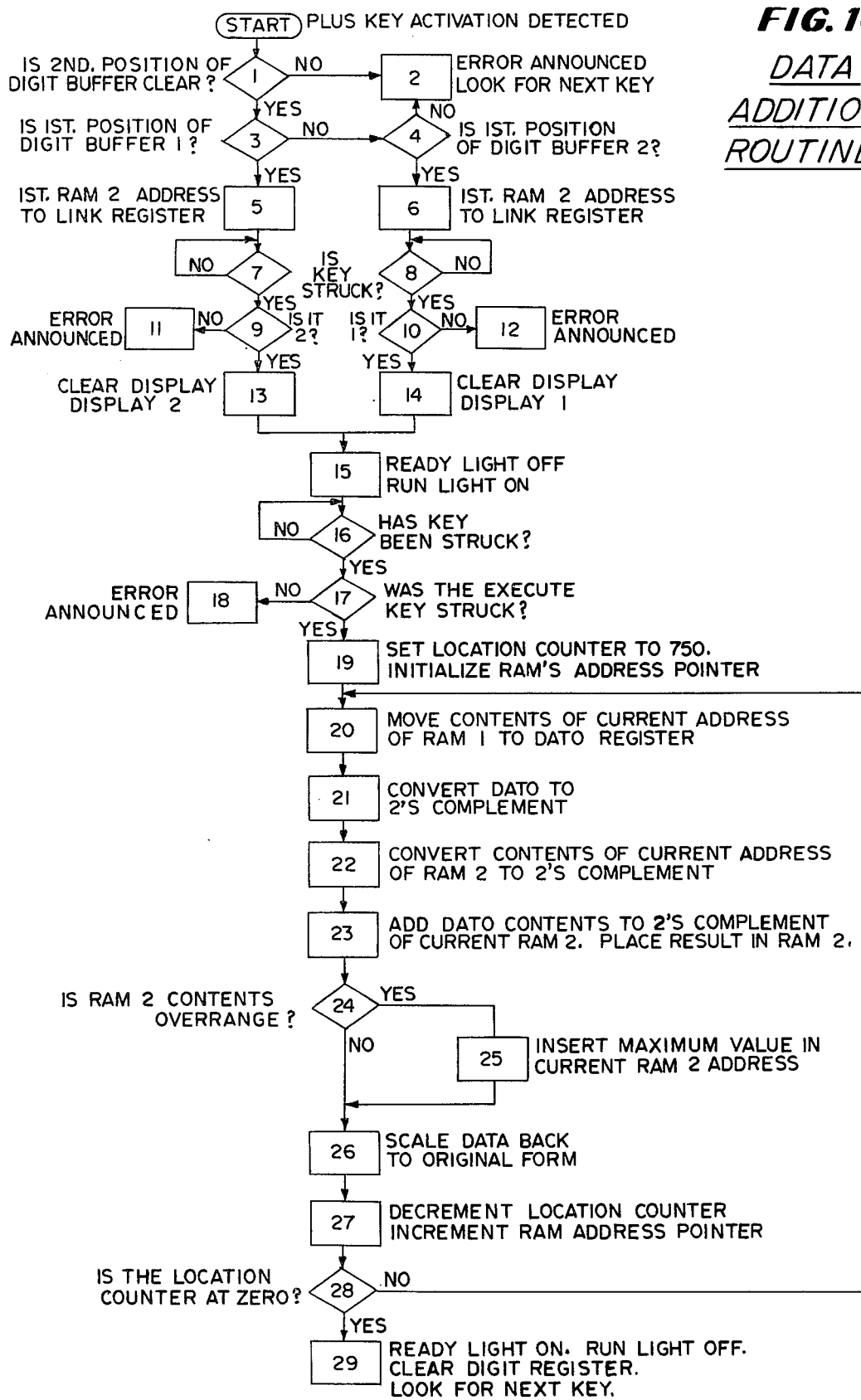
FIG. 10 illustrates a flow diagram of a Data Addition Routine which includes the operational steps performed by the data modifying apparatus in performing an addition routine of adding the data in one memory to the data in another memory.
Figure 12A:
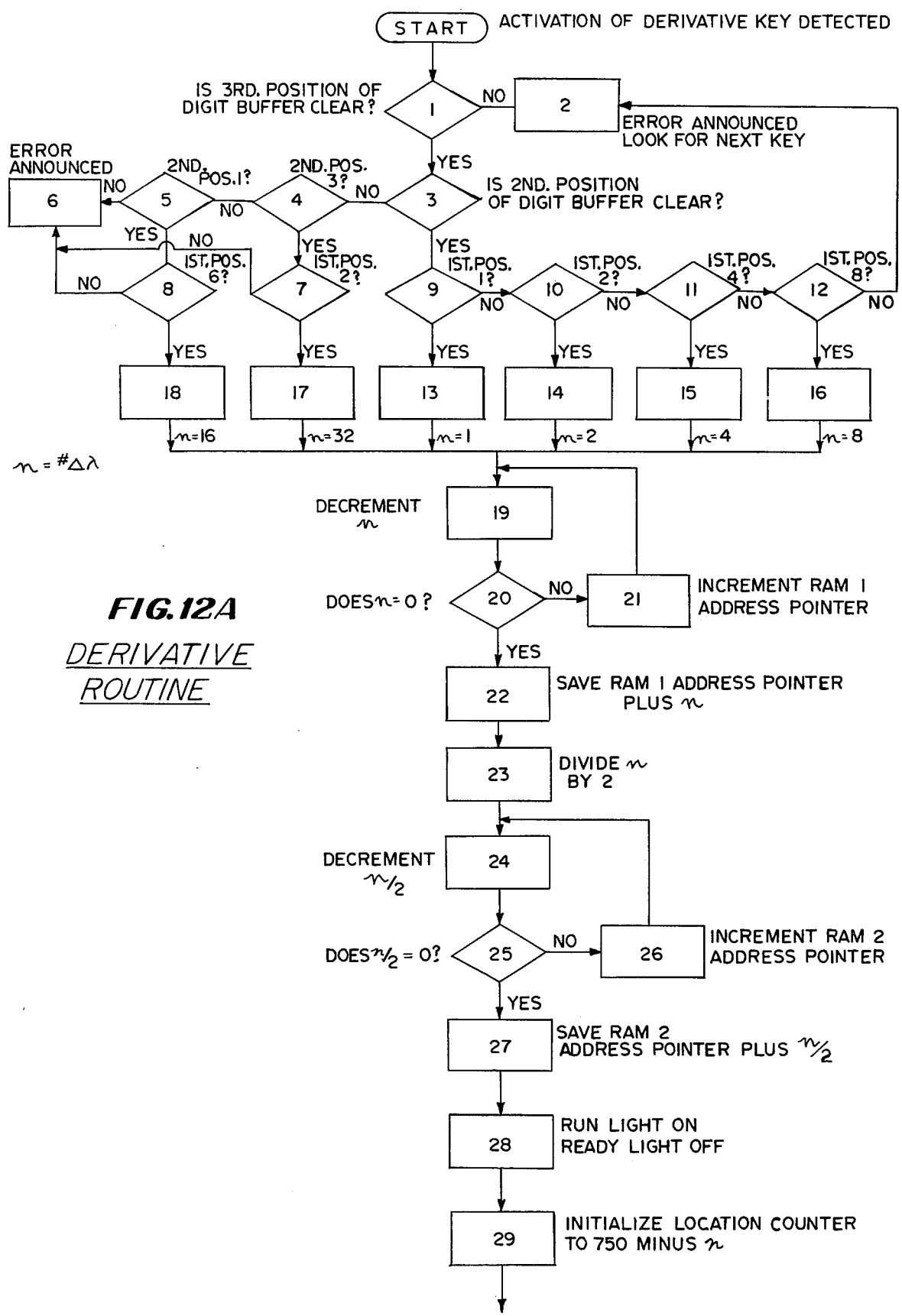

When there is a jump from the CRT Display Routine to the Cursor Routine, there is a momentary holding of the X axis sweep so that there is a momentary holding of the electron beam impinging upon the screen of the oscilloscope until the Interrupt Cursor Routine illustrated in FIG. 8 is executed. As a result of the momentary holding of the electron beam, there is an intensification of the spot on the screen of the oscilliscope at the point where the interrupt is occurring and the momentary holding appears as a spot which is referred to as a cursor dot. Thus, during this CRT Display Routine, an interrupt is generated when the count in the cursor counter coincides with the count in the X counter. This interrupt stops the CRT output to the scope from the apparatus 20, updates the displays of absorbance value and wavelength value in the visual displays 22 and 24 and then continues to sweep.

STEP 1. After the detection of depression of the CRT key 44, the cursor and run light are turned on, the cursor counter is reset and the ready light is turned off.

STEP 2. A check is made to see what digit is in the second position of the digit buffer, more specifically, is it clear. If NO, the routine goes to step 3.

STEP 3. The interrupt is disabled, the cursor and run lights are turned off and the ready light is turned on.

STEP 4. Next an error indication is made and the CPU 137 looks for the depression of another key.

STEP 5. If the answer to the question asked in Step 2 is YES, a check is made to see if the first digit is 1. If YES, the routine goes on the step 7. If NO, the routine goes on to step 6.

STEP 6. A check is made to see if the first position of the digit buffer is 2. If NO, the routine goes to steps 3 and 4. If YES, the routine goes to step 8.

STEP 7. A decision is made to steer data from RAM 1.

STEP 8. A decision is made to steer data from RAM 2.

STEP 9. At this step the data address of the first data point is stored at a location buffer PRSP located in the scratch pad memory. PRSP stands for "previous spectrum buffer". There is another buffer referred to as the previous X value buffer and this buffer is initialized to 1. This information is needed when an interrupt occurs.

STEP 10. The first data address from the PRSP buffer is then loaded into the address register in the CPU 137.

STEP 11. Here the point counter is set to 750 points, so that you can count the points by decrementing the counter and the interrupts are enabled.

STEP 12. The data at the first address is then output to the CRT 28. This is a Y axis output point. Also at this point the point counter is decremented by 1 to 749.

STEP 13. Here the count on the counter is checked to see if it is zero. If not, the routine loops back to step 12 to output another data point on the CRT, and a check of the output point counter is again made to make sure that the point being output isn't the last point in the scan. This continues until the point counter is decremented to zero.

STEP 14. If the answer to the question is yes and the count in the point counter is zero, then the routine goes to step 14. At step 14 a question is asked if a key has been struck. In other words, a key has to be struck to end the routine. If no key is struck, then the routine goes on to step 15.

STEP 15. At step 15 the interrupts are disabled, and the routine loops back to the beginning of step 10. This means that one sweep of the data points has been made on the CRT and that a key has not been struck to end the routine and the CRT Display Routine is repeated.

STEP 16. If a key has been depressed to start another routine, this ends the CRT Display Routine and the cursor and run lights are turned off, the ready light is turned on and the CPU 137 looks for the striking of the next key.

INTERRUPT CURSOR ROUTINE

FIG. 8

The interrupt routine is entered into when the count in the cursor counter coincides with the count in the X counter 162. The routine then causes the valve of absorbance and wavelength on the displays 22 and 24 to be updated to display the values at the point of interrupt.

STEP 1. After the detection of coincidence of the count in the cursor counter and the X counter 162, the data point at the current address is converted to a binary coded decimal. This is the data value from the address in the RAM which has been transferred to the address register in the CPU 137 and which is currently being displayed on the CRT 28. That data point is converted to a binary coded decimal and displayed on the display 24 to show the absorbance for that data point while the wavelength for that point is displayed on the digital display 22. The value in the register is saved and the interrupts are disabled. This is done so that the routine can go back to the CRT Display Routine in FIG. 7 with exactly what the registers contained when there was a jump from the CRT Display Routine to the Interrupt Cursor Routine and the CRT Display Routine can continue displaying the spectrum on the CRT 28. Also, since the routine is in the interrupt procedure, all the interrupts are disabled.

STEP 2. The question is then asked, is this the first interrupt. If it is the first interrupt, this means that there is no count in the current X buffer and nothing has been done to the wavelength display and it is vacant.

STEP 3. If the answer is YES, the starting wavelength is inserted into the empty current wavelength buffer and a flag is set saying that this is the first interrupt. Accordingly, on the next interrupt, the routine will not go through this procedure.

STEP 4. From step 3 (or step 2 in subsequent interrupts) the routine inputs the count on the X counter at the point of interrupt into the current X buffer.

STEP 5. Next the current X value (the count) that was stored in step 4 is compared with the previous X value in the previous X buffer. This is accomplished by subtracting the current X from the previous X and the result is put in the previous X buffer. If they are the same and the answer is zero, that means that the cursor counter has not been incremented.

STEP 6. At step 6 the question is asked if the result of the subtraction in step 5 is a + or −. If it is neither, and the answer is zero, the routine sees a +1 at step 6 and the routing goes directly to step 10.

STEP 7. Assume that the X count of the previous X was 100 and assume that the current X is 102. That provides a difference of −2. This means that an operator has moved the cursor bat-handle switch 30 twice. What happens then is that in step 5 the sign of the difference is minus and that means the routine goes to step 7. At step 7 a $\Delta\lambda$ (which equals the span divided by 750 such as the $\Delta\lambda$ of 0.4 for a span of 300 referred to in the Span Routine of FIG. 4) is added to the current wavelength of 100 in the current wavelength buffer.

STEP 8. Next the count in the previous X buffer is decremented.

STEP 9. Then a check is made to see if the previous X counter is zero. If no, the routine loops back to steps 7 and 8. In other words, another $\Delta\lambda$ is added to the current wavelength and the previous X count is decremented another count and this is done as many times as necessary to decrement the count to zero. In this case, it is decremented twice. This is happening very rapidly but it does take some time and this causes the electron beam to hold at that spot on the screen of the CRT for a short time.

STEP 10. Here the previous X count is decremented if the sign of the count in the previous X buffer was zero or positive. For zero, the result at step 5 is +1. A +1 for zero is added to the downscale count.

STEP 11. At this step a check is made to see if the previous X count is zero.

STEP 12. If not, $\Delta\lambda$ is subtracted from the current wavelength and the result is placed in the current wavelength buffer and the program loops around to step 10 again and the previous X is decremented again. This is done as many times as necessary to decrement the previous X count to zero and to subtract the corresponding number of $\Delta\lambda$'s from the current wavelength. When the previous X count is decremented to zero at either step 11 or step 9, the routine goes on to step 13.

STEP 13. Here the current X count is stored in the previous X buffer.

STEP 14. Here the current wavelength corresponding to the value placed in the current wavelength buffer is displayed on the wavelength display 22.

STEP 15. Here the registers in the CPU 137 are restored. That is to say, the conditions saved at step 1 are restored to the registers, e.g., the address register and the X and Y registers.

STEP 16. The Interrupt cursor Routine now returns to the CRT Display Routine and the interrupts are enabled.

PLOT CURSOR ROUTINE

FIG. 9.

This routine is used to move the recorder pen in accordance with the data stored in either RAM. As the pen plots a curve of absorbance versus wavelength for each data point, the absorbance and wavelength of each point is displayed on the digital displays 24 and 22. At the start of this routine, a check is made to see if the cursor key 50 has been struck.

STEP 1. A check is made to see if the second position of the digit buffer is clear.

STEP 2. If the answer in step 1 is no, an error condition is indicated.

STEP 3. A check is made to see if the first position of the digit buffer is 1.

STEP 4. If the answer is no, a check is made to see if the first position of the digit buffer is 2. If no, the routine goes to step 2 error condition.

STEP 5. If the answer to step 3 is yes, the CPU 137 steers data from RAM 1.

STEP 6. If the answer at step 4 is yes, the CPU 137 steers data from RAM 2.

STEP 7. After the RAM selection has been made the cursor light and run light are turned on and the ready light is turned off.

STEP 8. Here the starting wavelength is moved to the current wavelength buffer. This is a start wavelength value that was stored in a buffer and is transferred to a buffer called current wavelength buffer. The buffers are in the scratch pad memory.

STEP 9. The data modifying apparatus 20 assumes control of the recorder 16 and resets the X axis of the recorder to the starting, i.e., sweeps across to the origin.

STEP 10. Here a 200 millisecond delay is placed in the routine to allow the recorder pen to move to the starting point.

STEP 11. Here the data value in the current wavelength ($\lambda$) buffer is outputted to the visual display 22 to display the current wavelength.

STEP 12. Here the value of the data point of the current data address corresponding to the current wavelength is outputted to the recorder.

STEP 13. Here a 50 millisecond delay is inserted in the routine to allow the recorder pen to move upwardly along the Y axis.

STEP 14. Here a check is made to see if a key has been depressed to go into a different routine.

STEP 15. If the answer is yes, control of the recorder is relinquished, cursor and run lights are turned off, ready light is turned on and the CPU 137 looks for depression of a key.

STEP 16. If the answer is no, another question is asked and that is, has a cursor pulse been generated by the operation of the bat-handle switch 30. If there has not been a depression of the bat-handle switch 30, the routine cycles through steps 14 and 16 until there has been a depression of the bat handle switch 30.

STEP 17. At step 17 a question is askied if the bat handle switch is moved up or down. If it has been moved up, the routine moves to step 18.

STEP 18. The question is then asked if the current data address is at the upper limit of the RAM data. If the answer is yes, the routine loops back through steps 14–17.

STEP 19. Here you set a flag or carry to indicate that the routine wants to increment the current wavelength by a $\Delta\lambda$ increment.

STEP 20. Increment the data location counter to tell the CPU 137 the address of the data at that point.

STEP 21. At step 21 the data point value is converted to binary coded decimal and the updated absorbance value is displayed on display 24.

STEP 22. Going back to the question asked at step 17, if the bat-handle switch was moved downscale, then at step 22 the question is asked if the current address is at the lower limit of the RAM data. In other words, is it at zero on the Y axis. If the answer is yes, the routine loops back through steps 14, 16, 17 and 22.

STEP 23. If the answer is no, the flag or carry is reset to subtract one $\Delta\lambda$ from the current wavelength ($\lambda$).

STEP 24 Then the data location counter is decremented by 1 which tells the CPU the address of the data at that point.

STEP 25. Here the question is asked whether the carry set at step 19 or 23 was to add a $\Delta\lambda$ to, or to subtract a $\Delta\lambda$ from, the current wavelength buffer.

STEP 26. Here the $\Delta\lambda$ is added to the current wavelength buffer.

STEP 27. Here the $\Delta\lambda$ is subtracted from the current wavelength buffer. From step 27 the routine goes back to repeat steps 11–14 and waits for another cursor pulse at step 16.

In this routine, what happens is that when the bat-handle switch 30 is moved up or down, you move the recorder pen along the plot on the recorder. The sequence of steps described above for this routine will cause the pen to move along the curve in increments, and as it moves, the digital displays 22 and 24 are updated as to the wavelength and absorbance at each wavelength position of the recorder pen. Then when movement of the pen is stopped by releasing the bat-handle switch 30, the displays 22 and 24 will display the value of wavelength and absorbance at that point of the pen on the curve.

DATA ADDITION ROUTINE

FIG. 10.

This routine adds the contents of RAM 1 to that of RAM 2 and puts the result in RAM 2. The routine starts after the detection of depression of the plus key 52.

STEPS 1–4. These steps are the same as in the previous routine to find out if the proper digit buttons or keys have been depressed.

STEP 5. If the first digit depressed is 1, then at step 5 the first RAM 2 address is stored in a link register in the CPU 137.

STEP 6. If a 2 had been the first digit depressed, then at step 6 the first RAM 2 address is stored in the link register.

It is to be understood that $1+2=2+1$. Accordingly, steps 1–13 carry the routine along if digit 1 is pressed first and digit 2 is pressed second whereas steps 2–14 are followed if digit 2 is pressed first and digit 1 is pressed second. In either case, at steps 5 and 6, the first RAM 2 address is sent to the link register.

STEP 7. A question is asked if a key is struck. If no, the routine loops through step 7.

STEP 8. Again, the routine asks the question if a key has been struck and if no, the routine loops through step 8.

STEP 9. If the answer is yes at step 7, the question is asked if the digit is 2.

STEP 10. Likewise at step 10 the routine asks the question is the digit 1.

STEP 11. If the answer at 9 is no, then an error is announced.

STEP 12. If the answer at 10 is no, then an error is announced.

STEP 13. If the answer at step 9 is yes, at step 13 the display is cleared and the number 2 is displayed. This is to indicate that $1+2$ has been struck.

STEP 14. At this step, the display is cleared and 1 is displayed to indicate that $2+1$ has been struck.

STEP 15. Next the ready light is turned off and the run light is turned on.

STEP 16. At step 16 the question is asked if a key has been struck. If no, the routine loops through step 16.

STEP 17. Here the routine asks if the execute key 56 has been struck.

STEP 18. If not, an error is announced at step 18.

STEP 19. If the execute key has been struck, the location counter is set at 750 and the RAM address pointers are initialized so that the location counter can locate the address of the data of interest which at this time is the first point.

STEP 20. The contents of the current address of RAM 1 is moved to the DATO register.

STEP 21. The value moved into the DATO register is converted to 2's complement.

STEP 22. The contents of the current address of RAM 2 is converted to 2's complement.

STEP 23. The contents of DATO are added to 2's complement of current address of RAM 2 and the result is placed in the current address of RAM 2.

STEP 24. The routine then asks the question if the contents of RAM 2 are overrange. If the answer is yes, the routine goes to step 25.

STEP 25. Here the maximum permissible data value is inserted in the current RAM 2 address in place of the overrange value.

STEP 26. If the answer is no at 24 or the maximum value in the current RAM 2 address has been inserted in step 25, the data is scaled back from 2's complement to its original form.

STEP 27. The location counter is decremented and the RAM address pointer is incremented.

STEP 28. Here the question is asked if the location counter has been decremented to zero. If no, the routine goes back to the beginning of step 20 and repeats steps 20–28.

STEP 29. If the answer is yes, this means that the addition routine has been completed, the ready light is turned on, the run light is turned off, the digit register is cleared and the CPU 137 looks for the depression of the next key.

DATA SUBTRACTION ROUTINE

FIG. 11

This routine subtracts the contents of RAM 1 from the contents of RAM 2 and puts the results in RAM 2.

The start of the routine begins with the detection of the depression of the subtract key 54 after number key 2 has been struck.

STEP 1. A check is made to see if the second position of the digit buffer is clear.

STEP 2. If not, an error indication is made at step 2.

STEP 3. If the second position of the digit buffer is clear, a question is asked if the first position of the digit buffer contains a 2. If the answer is no, the routine goes to the step 2 error condition.

STEP 4. If the answer is yes, the first RAM 2 address is placed in a link register in the CPU 137.

STEP 5. A check is made to see if a key has been depressed. If the answer is no, the routine loops through step 5.

STEP 6. If the answer is yes, a check is made to see if 1 was struck after the minus key 54 was struck.

STEP 7. If the answer is no, an error indication is made.

STEP 8. Here a check is made to see if any other key has been struck. If no, the routine loops until it is struck.

STEP 9. Here a check is made to see if the execute key 56 has been struck.

STEP 10. If the answer is no, an error indication is made.

STEP 11. If the execute key has been struck, the RAM address pointer is initialized and the location counter is set to 750.

STEP 12. The contents of the current address of RAM 1, i.e., the first address point, is placed in the DATO buffer.

STEP 13. The data now in the DATO buffer is converted to 2's complement.

STEP 14. The data in the current address of RAM 2 is changed to 2's complement and the result is placed in RAM 2.

STEP 15. The contents of the DATO buffer from the current address of RAM 1 is subtracted from the contents of the current address of RAM 2 and the result is placed in the current address of RAM 2.

STEP 16. A check is made to see if the resulting value is overrange.

STEP 17. If the answer is yes, the maximum acceptable value is inserted into the current RAM 2 address in place of the overrange value.

STEP 18. The data in the RAM 2 address is converted from 2's complement to its original form.

STEP 19. The location counter is decremented 1 to 749 and the RAM address pointer is incremented.

STEP 20. A check is made to see if the location counter is zero. If not, the routine goes back to the beginning of step 12 and repeats steps 12-19.

STEP 21. If a check of the location counter indicates it is decremented to zero, then the ready light is turned on, the run light is turned off, the digit registers are cleared and the CPU 137 looks for the next key.

DERIVATIVE ROUTINE

FIGS. 12A-12B

This routine takes the derivative of the contents of RAM 1 and deposits the results in RAM 2. The data of RAM 1 is preserved and the previous contents of RAM 2 are discarded.

Prior to the striking of the DRV key 48 a $\Delta\lambda$ over which the derivative is to be taken is chosen. The $\Delta\lambda$ chosen is referred to as n and can be 1, 2, 4, 8, 16 or 32.

The routine is started by the detection of the striking of the DRV key 48.

STEP 1. A check is made to see if the third position of the digit buffer is clear.

STEP 2. If the answer is no, an alarm is indicated.

STEP 3. If the answer is yes, the question is asked to the second position of the digit buffer clear.

STEP 4. If the answer is no, the question is asked is the number in the second digit position 3.

STEP 5. If the answer is no, the question is asked is the digit 1.

STEP 6. If the answer is no, an error is indicated.

STEP 7. If the answer to step 4 is yes that the second position of the digit buffer contains a 3, the question is then asked, is the digit in the first position of the digit buffer 2. If the answer is no, an error is indicated at step 6.

STEP 8. If the answer at step 5 asking if the second position of the digit buffer contains a 1 is yes, at step 8 the question is asked is the digit 6. If the answer is no, an error is indicated.

STEP 9. If the answer at step 3 is the second position of the digit buffer clear is yes, then the question is asked if the first position of the digit buffer contains a 1.

STEP 10. If the answer is no, the question is asked, is the digit 2.

STEP 11. If the answer is no, the question is asked, is the first position digit 4.

STEP 12. If the answer is no, the question is asked, is the first position digit an 8. If the answer is no, an alarm is indicated.

STEP 13. If the answer at step 9 was 1 and we know that the second and third positions are clear, we know that N is 1 and this information is stored in a register in the scratch pad memory.

STEP 14. If the answer at step 10 is yes, the information that n is 2 is placed in a register in the scratch pad memory.

STEP 15. If the answer to step 11 was yes, the information that n is 4 is placed in the scratch pad memory.

STEP 16. If the answer at 12 was yes, the information that n is 8 is placed in the scratch pad memory.

STEP 17. If the answer at 7 is yes, the information that n is 32 is placed in the scratch pad memory.

STEP 18. If the answer at step 8 is yes, the information that n is 16 is placed in the scratch pad memory.

STEP 19. Here a counter in the CPU 137 is decremented n times.

STEP 20. Here the question is asked is n 0 after each decrement.

STEP 21. If the answer is no, the RAM 1 address pointer is incremented and the decrement at step 19 is repeated until n is 0.

STEP 22. When n is 0, the RAM 1 address pointer value+n is saved. There are three pointers. One is the address pointer, the second is the address pointer+n and the third is is the address pointer+n/2.

STEP 23. Here n is divided by 2.

STEP 24. A counter is decremented n/2.

STEP 25. Here the question is asked is the n/2 counter at zero.

STEP 26. If the answer is no, the RAM 2 address pointer is incremented. This procedure is continued until the n/2 count is zero.

STEP 27. Here the RAM 2 address pointer+n/2 value is saved.

STEP 28. The run light is turned on and the ready light is turned off.

STEP 29. The location counter is now initialized to 750−n and the routine goes on to a step 31—(no step 30).

STEP 31. The contents of the current address of RAM 1 is moved to a DATO buffer in the CPU 137.

STEP 32. The contents of the DATO buffer is converted to 2's complement.

STEP 33. The contents of the current address of RAM 1+n is moved to the DATN buffer in the CPU 137.

STEP 34. The contents of the DATN buffer is converted to 2's complement.

STEP 35. The contents of the data buffer is subtracted from the contents of the DATN buffer and the result is placed in the DATN buffer.

STEP 36. A question is asked if the resultant value is overrange.

STEP 37. If the answer is yes, then the maximum permissible value of the data is inserted in the DATN buffer in place of the overrange value.

STEP 38. If the answer is no, or we have converted in step 37, the data in the DATN buffer is converted from 2's complement to its original form.

STEP 39. The value in the DATN buffer is stored in the current RAM 2+n/2 address.

STEP 40. The RAM 1+n pointer is incremented. The RAM 2+n/2 pointer is incremented and the RAM 1 address pointer is incremented.

STEP 41. The location counter is decremented from 750−n.

STEP 42. A check is made to see if the location counter is at zero. If the answer is no, the routine goes back to the beginning of step 31 and repeats steps 31–42.

STEP 43. When the location counter is zero, the routine goes to step 43 where the run light is turned off, the ready light is turned on and the CPU 137 looks for the striking of another key.

In an example where n is 32 and the starting point is λ start=200, the data point at 200 is subtracted from the data point at 232 in RAM 1. This subtraction is proportional to the derivative at midscale which is n/2 or a data point at λ=216. Accordingly, the routine puts the data value obtained by subtracting the data at λ=200 from the data at λ=232 and places it at the address λ=216. Next the routine would subtract the data value at λ=201 from the data value at λ=233 and place it in RAM 2 at λ=217. This continues until the routine goes through the span. A plot of the data points equals a curve of the derivative of the spectrum.

From the foregoing description it will be appreciated that the data modifying apparatus 20 of the present invention has a number of advantages some of which are described above and others of which are inherent in the invention. Accordingly the scope of the invention is only to be limited as necessitated by the accompanying claims.

We claim:

1. A control apparatus for use with a dual beam spectrophotometer of the type in which light from a light source is split into two beams which are directed along respective first and second optical paths to a photosensitive device, the first optical path passing through a reference station and the second optical path passing through a sample station, and of the type which includes means for changing the wavelength of the light from a light source over a predetermined time period through a span of at least 75 nanometers and up to 600 nanometers or some segment thereof, starting at a wavelength of 200 nanometers or greater and proceeding up to a wavelength of 825 nanometers or less, means associated with the wavelength changing means for producing an output signal indicative of a particular wavelength of the light beams at any point in time and signal generating means coupled to the photosensitive device for subtracting the log of each signal generated by the light received by the photosensitive device from the second optical path from the log of each signal generated by light received by the photosensitive device from the first optical path and then producing a log difference signal indicative of absorbance, said control apparatus comprising electric circuit means including control, processing and memory circuits adapted to be coupled to the spectrophotometer for receiving and storing signals therefrom, said electric circuit means including first memory circuit means and second memory circuit means for receiving and storing the varying log difference signals, control and processing means for manipulating the data comprised of signal values stored in said memory circuit means, said manipulations including transferring data in one memory circuit means to the other memory circuit means, adding data from one to the data of the other, subtracting data in one from data in the other and taking the derivative of data stored in one of the memory circuit means, wavelength digital display means, absorbance digital display means, and said control and processing circuit means being coupled to a recorder in the spectrophotometer and being operable to cause movement of a pen of the recorder to plot a spectrum of wavelength v. absorbance on the recorder from a spectrum of varying log difference signals which are related to absorbance and which are stored in said one of said memory circuit means, and said control and processing means including control means coupled to said one of said memory circuit means for causing a cursor operation on the curve plotted on the recorder, said cursor being seen as a holding of the pen at a particular point on the curve and said control and processing means being operable to cause a display on said respective wavelength and absorbance digital display means of the wavelength and absorbance at the particular position of the pen on the curve plotted on the recorder and said control means including means for moving said pen in increments along the curve plotted on the recorder.

2. A control apparatus for use with a dual beam spectrophotometer of the type in which light from a light source is split into two beams which are directed along respective first and second optical paths to a photosensitive device, the first optical path passing through a reference station and the second optical path passing through a sample station, and of the type which includes means for changing the wavelength of the light from a light source over a predetermined time period through a span of at least 75 nanometers and up to 600 nanometers or some segment thereof, starting at a wavelength of 200 nanometers or greater and proceeding up to a wavelength of 825 nanometers or less, means associated with the wavelength changing means for producing an output signal indicative of a particular wavelength of the light beams at any point in time and signal generating means coupled to the photosensitive device for subtracting the log of each signal generated by the light received by the photosensitive device from the second optical path from the log of each signal generated by light received by the photosensitive device from the first optical path and then producing a log difference signal indicative of absorbance, said control apparatus comprising electric circuit means including control, processing and memory circuits adapted to be coupled to the spectrophotometer for receiving and storing signals therefrom, said electric circuit means including first memory circuit means and second memory circuit means for receiving and storing the varying log difference signals, control and processing means for manipulating the data comprised of signal values stored in said memory circuit means, said manipulations including transferring data in one memory circuit means to the other memory circuit means, adding data from one of the data of the other, subtracting data in one from data in the other and taking the derivative of data stored in one of the memory circuit means, wavelength digital display means, absorbance digital display means, and visual display means coupled to one of said memory circuits, said control and processing means being operable to cause a graph of wavelength v. absorbance to be traced and displayed on said visual display means, such graph representing the signal values corresponding to absorbance stored in said one of said memory circuit means for a particular wavelength span and said control and processing means including control means coupled to said one of said memory circuit means for causing a cursor operation on the graph shown on the visual display device, said cursor operation being seen as an intensified dot on the waveform shown on the visual display device and said control means including means for moving said dot along said waveform in increments and for causing the particular wavelength and absorbance values at the point on the graph where the dot is located to be shown on said respective wavelength and absorbance digital display means.

3. The data modifying apparatus according to claim 2 wherein said control and processing means includes a central processing unit coupled to said first and second memory circuit means which are random access memory circuits, a read only memory circuit coupled through address circuitry to said contral processing unit, selection logic circuitry coupled to said central processing unit and having pulse inputs and an interrupt input, data distribution logic circuitry coupled to said central processing unit and to a Y-axis absorbance control output and to an X-axis wavelength control output, an X counter serially coupled to and between said data distribution logic circuitry and said X-axis wavelength control output, and cursor control means including a manually operated cursor increment upscale-downscale switch, a cursor generator coupled to said cursor increment switch and having outputs coupled to said pulse inputs of said selection logic circuitry, a cursor counter having inputs coupled to said outputs of said cursor signal generator and comparing means coupled to the outputs of said X counter and the outputs of said cursor counter for comparing the counts therein and having an output coupled to said interrupt input of said selection logic circuitry, said cursor control means being operable upon operation of said cursor increment switch to compare counts in said counters and upon coincicense, to send an interrupt signal to said interrupt input of said selection logic to cause updating in buffers in said random access memory circuits of (a) the cursor count of wavelength increments, (b) the wavelength at that particular count of wavelength increments, and (c) the corresponding absorbance value, movement of the electron beam of the oscilloscope being held while such updating takes place causing an intensified spot to develop on the screen of the oscilloscope to create the cursor dot.

* * * * *